US012725159B2

(12) United States Patent
Gupta et al.

(10) Patent No.: US 12,725,159 B2
(45) Date of Patent: Sep. 1, 2026

(54) METHODS AND SYSTEMS FOR IDENTIFYING A RE-ROUTED TRANSACTION

(71) Applicant: MASTERCARD INTERNATIONAL INCORPORATED, Purchase, NY (US)

(72) Inventors: Anubhav Gupta, Lucknow (IN); Hardik Wadhwa, Sirsa (IN); Siddharth Vimal, Chandigarh (IN); Siddhartha Asthana, Ghaziabad (IN); Ankur Arora, New Delhi (IN); Paul John Paolucci, West Harrison, NY (US); Ganesh Nagendra Prasad, Stamford, CT (US); Jonathan Trivelas, Stormville, NY (US); Samantha Medina, Elmsford, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 13 days.

(21) Appl. No.: 17/552,476

(22) Filed: Dec. 16, 2021

(65) Prior Publication Data

US 2023/0095834 A1 Mar. 30, 2023

(30) Foreign Application Priority Data

Sep. 29, 2021 (IN) ............................ 202141044282

(51) Int. Cl.
*G06Q 20/40* (2012.01)
*G06N 3/08* (2023.01)

(52) U.S. Cl.
CPC ........... *G06Q 20/4016* (2013.01); *G06N 3/08* (2013.01); *G06Q 20/405* (2013.01)

(58) Field of Classification Search
CPC ......................... G06Q 20/4016; G06Q 20/405
See application file for complete search history.

(56) References Cited

U.S. PATENT DOCUMENTS

2020/0074471 A1* 3/2020 Adjaoute ............... G06Q 40/12
2021/0192640 A1* 6/2021 Rolfs ................. G06F 16/2379

* cited by examiner

*Primary Examiner* — Arunava Chakravarti
(74) *Attorney, Agent, or Firm* — Barta Jones, PLLC

(57) ABSTRACT

Embodiments provide methods and systems for identifying a re-routed transaction. Method performed by processor includes retrieving a plurality of transaction windows from a transaction database. Each transaction window includes a transaction declined under a restricted MCC. The method includes accessing a plurality of features associated with each transaction of each transaction window from the transaction database. The method includes predicting an output dataset of a plurality of reconstructed transaction windows based on feeding the input dataset to a trained neural network model. The method includes computing a corresponding reconstruction loss value for each transaction of each transaction window. The method includes comparing the corresponding reconstruction loss value for each transaction with a pre-determined threshold value. The method includes identifying the transaction as a re-routed transaction corresponding to the transaction declined under the restricted MCC, if a corresponding reconstruction loss value for a transaction is higher than the pre-determined threshold value.

20 Claims, 22 Drawing Sheets

TO/FROM REMOTE DEVICE 218

COMMUNICATION INTERFACE 210

USER INTERFACE 216

MEMORY 208

212

PROCESSOR 206

FEATURE EXTRACTION ENGINE 220

SEQUENCE ENGINE 222

HETEROGENEOUS GRAPH CONVOLUTIONAL NETWORK (HGCN) ENGINE 224

PRINCIPAL COMPONENT ANALYSIS (PCA) ENGINE 226

SIMILARITY COMPUTATION ENGINE 228

RECONSTRUCTION LOSS COMPUTATION ENGINE 230

TRAINED NEURAL NETWORK ENGINE 232

STORAGE INTERFACE 214

DATABASE 204

COMPUTER SYSTEM 202

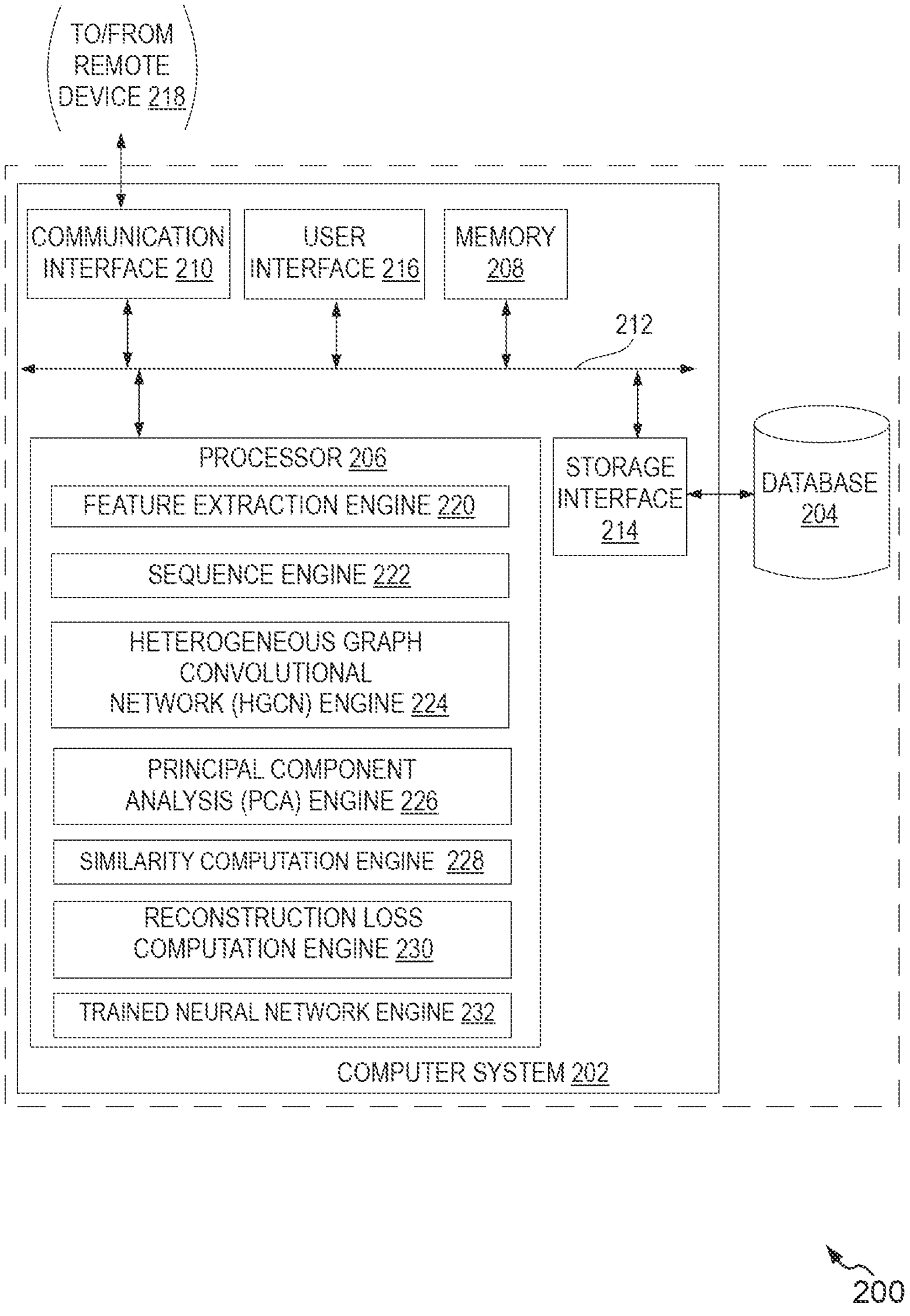

| | FEATURE_1 | FEATURE_2 | ....... | FEATURE_99 | FEATURE_100 |
|---|---|---|---|---|---|
| 404a M1 | 0.13 | 0.45 | ....... | 0.37 | 0.01 |
| 404b M2 | 0.97 | 0.40 | ....... | 0.87 | 0.12 |
| 404c M3 | 0.08 | 0.52 | ....... | 0.62 | 0.70 |
| 404d M4 | ....... | ....... | ....... | ....... | ....... |
| 404e M5 | ....... | ....... | ....... | ....... | ....... |
| 404d M6 | ....... | ....... | ....... | ....... | ....... |

TOTAL MERCHANTS (=5K) 462

EMBEDDING SIZE (=100) 464

| | FEATURE_1 | FEATURE_2 | ........ | FEATURE_99 | FEATURE_100 |
|---|---|---|---|---|---|
| M1 | 0.13 | 0.45 | | 0.37 | 0.01 |
| M2 | 0.97 | 0.40 | | 0.87 | 0.12 |
| M3 | 0.08 | 0.52 | | 0.62 | 0.70 |

506, 504a, 504b, 504c

500A

500B

510

| MERCHANT | FEATURE_1 | FEATURE_2 | ........ | FEATURE_99 | FEATURE_100 | |
|---|---|---|---|---|---|---|
| M1 (504a) | 0.13 | 0.45 | ........ | 0.37 | 0.01 | X 0.4 |
| M2 (504b) | 0.08 | 0.52 | ........ | 0.62 | 0.70 | X 0.4 |
| M3 (504c) | 0.97 | 0.40 | ........ | 0.87 | 0.12 | X 0.2 |

530 WEIGHTED AVERAGE OF EMBEDDINGS BASED ON THEIR TXN COUNT

540

| CARD | FEATURE_1 | FEATURE_2 | ........ | FEATURE_99 | FEATURE_100 |
|---|---|---|---|---|---|
| CARD 1 | 0.28 | 0.47 | ........ | 0.40 | 0.31 (515) |

| | FEATURE_1 | FEATURE_2 | ....... | FEATURE_99 | FEATURE_100 |
|---|---|---|---|---|---|
| 604a MCC1 | 0.13 | 0.45 | ....... | 0.37 | 0.01 |
| 604b MCC2 | 0.97 | 0.40 | ....... | 0.87 | 0.12 |
| 604c MCC3 | 0.08 | 0.52 | ....... | 0.62 | 0.70 |
| 604d MCC4 | ....... | ....... | ....... | ....... | ....... |
| 604e MCC5 | ....... | ....... | ....... | ....... | ....... |
| 604f MCC6 | ....... | ....... | ....... | ....... | ....... |

TOTAL MCC (=2K) 610

EMBEDDING SIZE (=100) 615

| MERC-HANT | FEATURE _1 | FEATURE _2 | ........ | FEATURE _99 | FEATURE _100 |
|---|---|---|---|---|---|
| M1 | 0.13 | 0.45 | | 0.37 | 0.01 |
| M2 | 0.97 | 0.40 | | 0.87 | 0.12 |
| M3 | 0.08 | 0.52 | | 0.62 | 0.70 |
| M4 | 0.12 | 0.40 | | 0.22 | 0.09 |

| CARD | FEATURE _1 | FEATURE _2 | ........ | FEATURE _99 | FEATURE _100 |
|---|---|---|---|---|---|
| C1 | 0.12 | 0.51 | | 0.10 | 0.19 |
| C2 | 0.97 | 0.33 | | 0.91 | 0.01 |
| C3 | 0.72 | 0.98 | | 0.27 | 0.43 |
| C4 | 0.18 | 0.10 | | 0.21 | 0.30 |

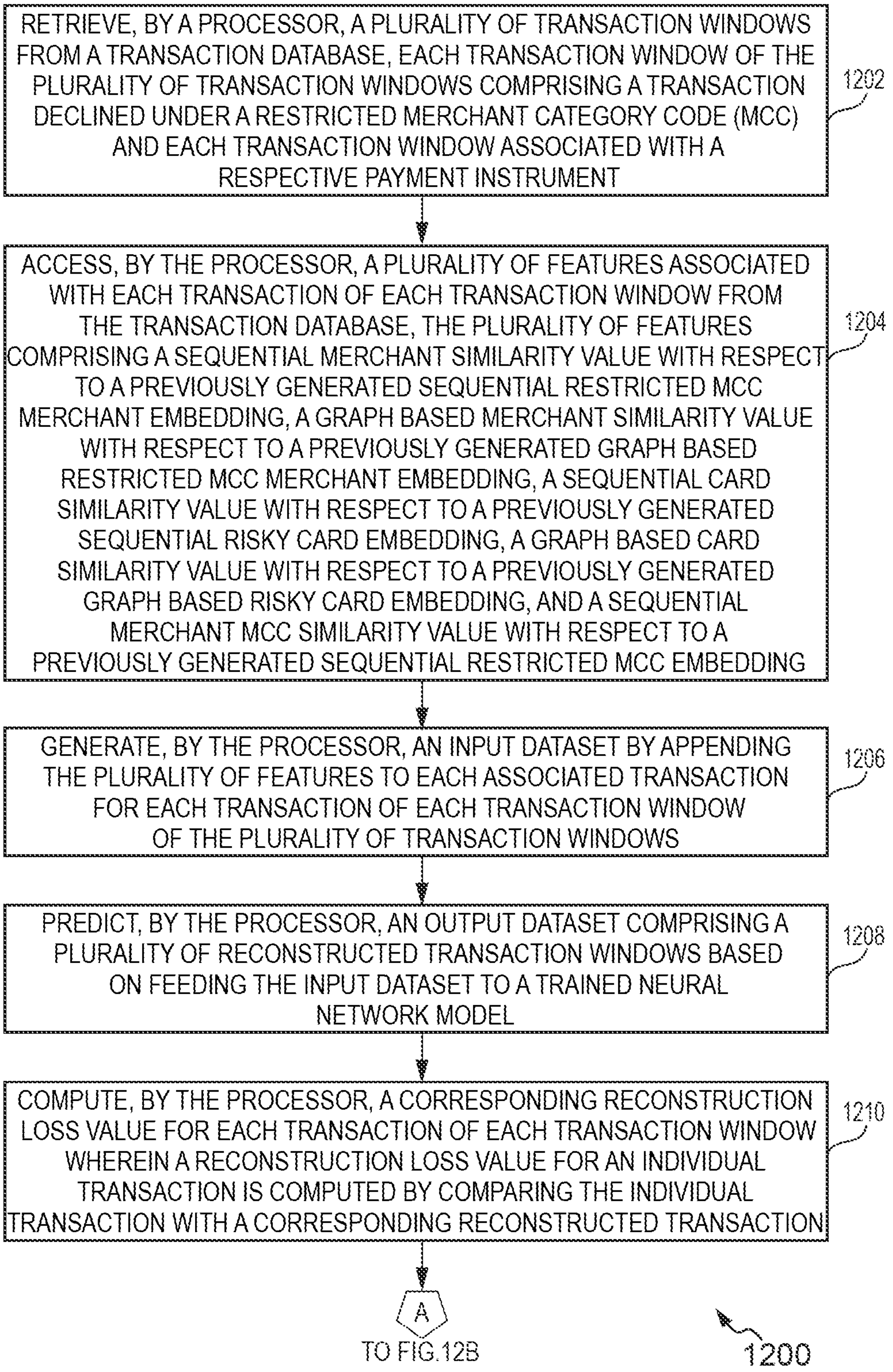

FIG. 12A

RETRIEVE, BY A PROCESSOR, A PLURALITY OF TRANSACTION WINDOWS FROM A TRANSACTION DATABASE, EACH TRANSACTION WINDOW OF THE PLURALITY OF TRANSACTION WINDOWS COMPRISING A TRANSACTION DECLINED UNDER A RESTRICTED MERCHANT CATEGORY CODE (MCC) AND EACH TRANSACTION WINDOW ASSOCIATED WITH A RESPECTIVE PAYMENT INSTRUMENT

1202

ACCESS, BY THE PROCESSOR, A PLURALITY OF FEATURES ASSOCIATED WITH EACH TRANSACTION OF EACH TRANSACTION WINDOW FROM THE TRANSACTION DATABASE, THE PLURALITY OF FEATURES COMPRISING A SEQUENTIAL MERCHANT SIMILARITY VALUE WITH RESPECT TO A PREVIOUSLY GENERATED SEQUENTIAL RESTRICTED MCC MERCHANT EMBEDDING, A GRAPH BASED MERCHANT SIMILARITY VALUE WITH RESPECT TO A PREVIOUSLY GENERATED GRAPH BASED RESTRICTED MCC MERCHANT EMBEDDING, A SEQUENTIAL CARD SIMILARITY VALUE WITH RESPECT TO A PREVIOUSLY GENERATED SEQUENTIAL RISKY CARD EMBEDDING, A GRAPH BASED CARD SIMILARITY VALUE WITH RESPECT TO A PREVIOUSLY GENERATED GRAPH BASED RISKY CARD EMBEDDING, AND A SEQUENTIAL MERCHANT MCC SIMILARITY VALUE WITH RESPECT TO A PREVIOUSLY GENERATED SEQUENTIAL RESTRICTED MCC EMBEDDING

1204

GENERATE, BY THE PROCESSOR, AN INPUT DATASET BY APPENDING THE PLURALITY OF FEATURES TO EACH ASSOCIATED TRANSACTION FOR EACH TRANSACTION OF EACH TRANSACTION WINDOW OF THE PLURALITY OF TRANSACTION WINDOWS

1206

PREDICT, BY THE PROCESSOR, AN OUTPUT DATASET COMPRISING A PLURALITY OF RECONSTRUCTED TRANSACTION WINDOWS BASED ON FEEDING THE INPUT DATASET TO A TRAINED NEURAL NETWORK MODEL

1208

COMPUTE, BY THE PROCESSOR, A CORRESPONDING RECONSTRUCTION LOSS VALUE FOR EACH TRANSACTION OF EACH TRANSACTION WINDOW WHEREIN A RECONSTRUCTION LOSS VALUE FOR AN INDIVIDUAL TRANSACTION IS COMPUTED BY COMPARING THE INDIVIDUAL TRANSACTION WITH A CORRESPONDING RECONSTRUCTED TRANSACTION

1210

1200

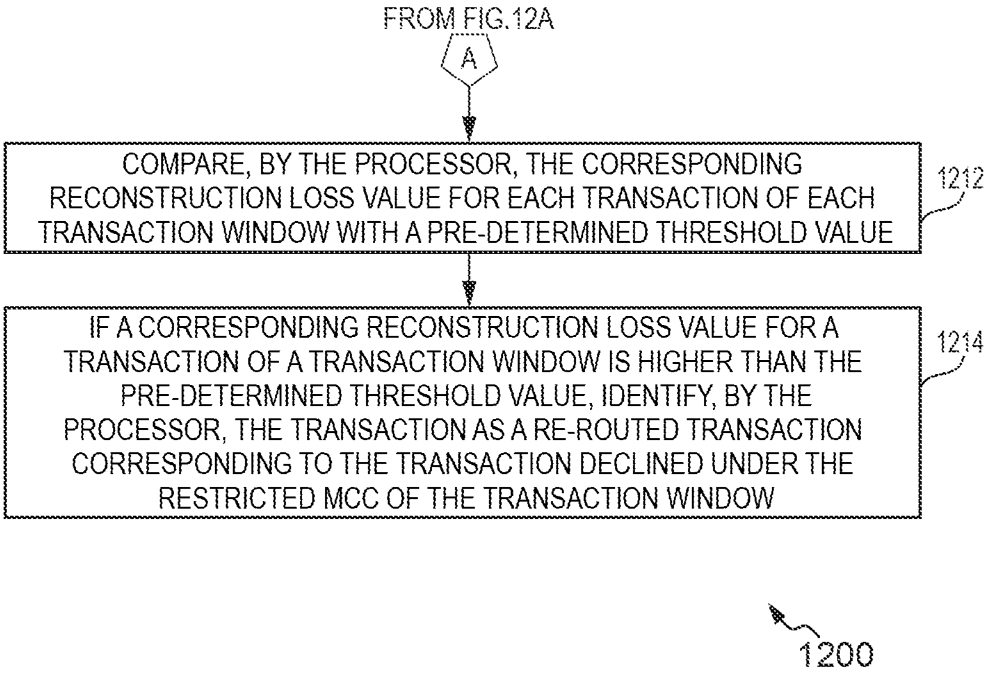

FIG. 12B

COMPARE, BY THE PROCESSOR, THE CORRESPONDING RECONSTRUCTION LOSS VALUE FOR EACH TRANSACTION OF EACH TRANSACTION WINDOW WITH A PRE-DETERMINED THRESHOLD VALUE

1212

IF A CORRESPONDING RECONSTRUCTION LOSS VALUE FOR A TRANSACTION OF A TRANSACTION WINDOW IS HIGHER THAN THE PRE-DETERMINED THRESHOLD VALUE, IDENTIFY, BY THE PROCESSOR, THE TRANSACTION AS A RE-ROUTED TRANSACTION CORRESPONDING TO THE TRANSACTION DECLINED UNDER THE RESTRICTED MCC OF THE TRANSACTION WINDOW

1214

1200

RETRIEVE, BY A PROCESSOR, A TRANSACTION WINDOW ASSOCIATED WITH A PAYMENT CARD FROM A TRANSACTION DATABASE, FIRST TRANSACTION OF THE TRANSACTION WINDOW BEING A TRANSACTION DECLINED UNDER A RESTRICTED MERCHANT CATEGORY CODE (MCC) 1302

ACCESS, BY THE PROCESSOR, A PLURALITY OF TRANSACTIONAL FEATURES, A PLURALITY OF CARD FEATURES, AND A PLURALITY OF MERCHANT FEATURES ASSOCIATED WITH EACH TRANSACTION OF THE TRANSACTION WINDOW FROM THE TRANSACTION DATABASE, THE PLURALITY OF MERCHANT FEATURES COMPRISING A SEQUENTIAL MERCHANT SIMILARITY VALUE WITH RESPECT TO A PREVIOUSLY GENERATED SEQUENTIAL RESTRICTED MCC MERCHANT EMBEDDING, A GRAPH BASED MERCHANT SIMILARITY VALUE WITH RESPECT TO A PREVIOUSLY GENERATED GRAPH BASED RESTRICTED MCC MERCHANT EMBEDDING, AND A SEQUENTIAL MERCHANT MCC SIMILARITY VALUE WITH RESPECT TO A PREVIOUSLY GENERATED SEQUENTIAL RESTRICTED MCC EMBEDDING AND WHEREIN THE PLURALITY OF CARD FEATURES COMPRISING A SEQUENTIAL CARD SIMILARITY VALUE WITH RESPECT TO A PREVIOUSLY GENERATED SEQUENTIAL RISKY CARD EMBEDDING, A GRAPH BASED CARD SIMILARITY VALUE WITH RESPECT TO A PREVIOUSLY GENERATED GRAPH BASED RISKY CARD EMBEDDING 1304

GENERATE, BY THE PROCESSOR, AN INPUT DATASET BY APPENDING THE PLURALITY OF TRANSACTIONAL FEATURES, THE PLURALITY OF CARD FEATURES, AND THE PLURALITY OF MERCHANT FEATURES TO EACH ASSOCIATED TRANSACTION FOR EACH TRANSACTION OF THE TRANSACTION WINDOW 1306

PREDICT, BY THE PROCESSOR, AN OUTPUT DATASET COMPRISING A RECONSTRUCTED TRANSACTION WINDOW BASED ON FEEDING THE INPUT DATASET TO A PREVIOUSLY TRAINED A LONG SHORT-TERM MEMORY (LSTM) AUTOENCODER WITH AN ATTENTION LAYER MODEL 1308

COMPUTE, BY THE PROCESSOR, A CORRESPONDING RECONSTRUCTION LOSS VALUE FOR EACH TRANSACTION OF THE TRANSACTION WINDOW BY COMPARING EACH TRANSACTION OF THE INPUT DATASET WITH EACH CORRESPONDING RECONSTRUCTED TRANSACTION OF THE RECONSTRUCTED TRANSACTION WINDOW OF THE OUTPUT DATASET 1310

1300

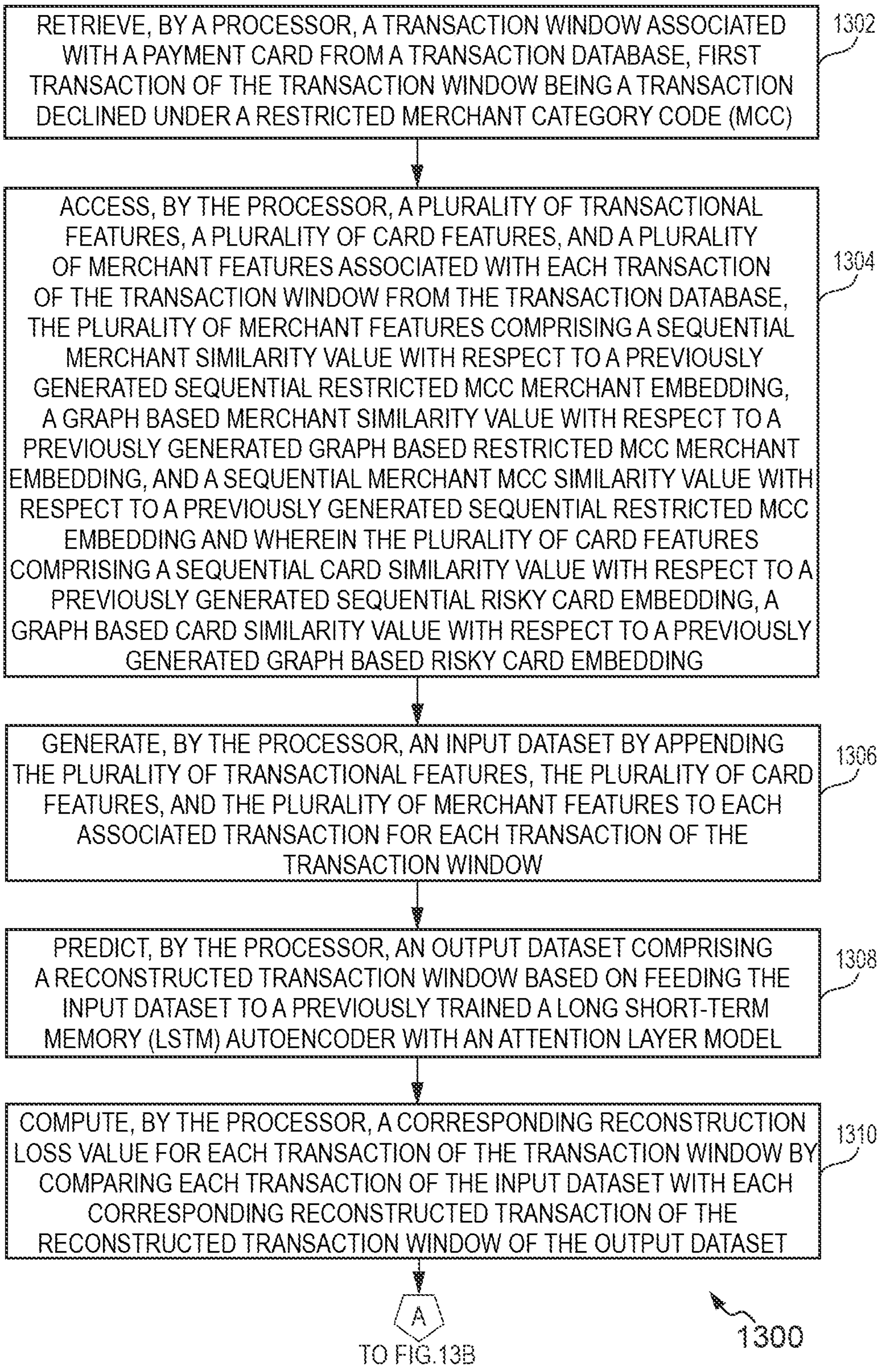

FIG. 13A

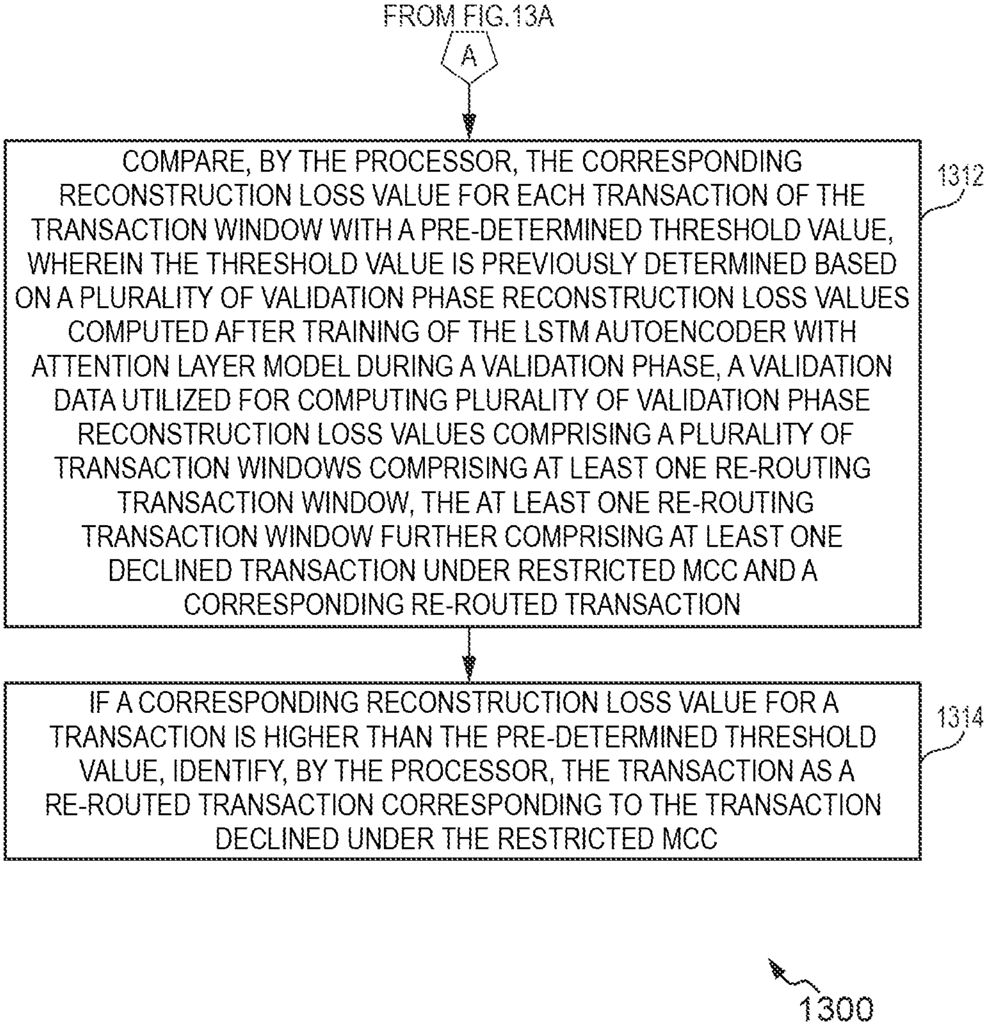

FIG. 13B

FROM FIG.13A

COMPARE, BY THE PROCESSOR, THE CORRESPONDING RECONSTRUCTION LOSS VALUE FOR EACH TRANSACTION OF THE TRANSACTION WINDOW WITH A PRE-DETERMINED THRESHOLD VALUE, WHEREIN THE THRESHOLD VALUE IS PREVIOUSLY DETERMINED BASED ON A PLURALITY OF VALIDATION PHASE RECONSTRUCTION LOSS VALUES COMPUTED AFTER TRAINING OF THE LSTM AUTOENCODER WITH ATTENTION LAYER MODEL DURING A VALIDATION PHASE, A VALIDATION DATA UTILIZED FOR COMPUTING PLURALITY OF VALIDATION PHASE RECONSTRUCTION LOSS VALUES COMPRISING A PLURALITY OF TRANSACTION WINDOWS COMPRISING AT LEAST ONE RE-ROUTING TRANSACTION WINDOW, THE AT LEAST ONE RE-ROUTING TRANSACTION WINDOW FURTHER COMPRISING AT LEAST ONE DECLINED TRANSACTION UNDER RESTRICTED MCC AND A CORRESPONDING RE-ROUTED TRANSACTION

1312

IF A CORRESPONDING RECONSTRUCTION LOSS VALUE FOR A TRANSACTION IS HIGHER THAN THE PRE-DETERMINED THRESHOLD VALUE, IDENTIFY, BY THE PROCESSOR, THE TRANSACTION AS A RE-ROUTED TRANSACTION CORRESPONDING TO THE TRANSACTION DECLINED UNDER THE RESTRICTED MCC

1314

1300

METHODS AND SYSTEMS FOR IDENTIFYING A RE-ROUTED TRANSACTION

TECHNICAL FIELD

The present disclosure relates to artificial intelligence processing systems and, more particularly to, electronic methods and complex processing systems for identifying a re-routed transaction approved after a transaction declined under a restricted Merchant Category Card (MCC) by utilizing deep learning techniques.

BACKGROUND

Nowadays, many consumers use several banking cards/payment cards, such as credit cards, debit cards, prepaid cards, etc., for performing financial transactions (e.g., payment transaction). Online purchases done using credit or debit cards are referred as Card Not Present (CNP) transactions. Every merchant needs a merchant account to process payment transactions, and every merchant account has a Merchant Category Card (MCC) assigned by the merchant account provider/acquirer as part of the account process setup. An MCC is a four-digit code that explains to all participants in the payment ecosystem what kind of merchant one is—from grocery store to gas station, to software as a service (SaaS) business or oil and gas wholesaler. MCCs are assigned to the merchants as part of the due diligence performed by the acquirers for the merchants. It is the responsibility of the merchant acquiring bank to ensure they have selected and applied the correct MCC to a merchant ID so that the issuer can identify what type of transaction its cardholder is performing, from what website and in which country.

Over time, the risk systems built into card issuers and their processors' systems started using MCC as a trigger for flagging and blocking transactions. Issuers can block transactions at the interchange BIN level based on MCC, country code, and more recently Ecommerce Indicator (ECI). Transactions can also be blocked at the point of authorization based on a variety of parameter settings. The transactions coming from a restricted MCC that is part of a list of restricted MCCs are generally declined by the issuers for safety purposes.

MCC 7995 is an example of such restricted MCC that identifies merchants that are processing card transactions related to online casinos which includes lotteries, off-track betting and the sale of gambling chips. Online casino merchants are required to be registered under 7995 MCC in an effort to provide real-time risk monitoring and reporting. MCC 7995 transactions are often contested by cardholders after the fact, either due to buyer's remorse or fraudulent activity. As a result, many issuing banks and their processors block/restrict any transaction request received under MCC 7995.

When a transaction under MCC 7995 or any other restricted MCC is declined, the merchant may still wish to go through the transaction via different routes to get the approval. One of the routes is through a re-routing merchant. A re-routing merchant uses an MCC other than a restricted MCC, basically hides the identity, and re-routes the declined transaction to get the approval. A lot of times, the merchant may be able to hide his true nature and not get encoded under MCC 7995 and still act as a gambling merchant which is then used to re-route the declined transaction. Thus, either the merchant can be miscoded or there can be collusion with other merchants to get the declined transaction approved.

Identifying such a re-routed transaction is a challenge as it is a rare event problem, and it involves identifying the previously declined transaction as well. Since merchants are miscoded and MCCs are different every time for the re-routed transactions, relying on the raw field of restricted MCCs is not sufficient. This leads to a need for establishing semantic relationships between the merchants. Current methodology involves manual checking of transactions around declines within a specific time and with a specific amount limit to capture the re-routed transactions. This method suffers from not only manual inspection but also generation of false positives.

SUMMARY

Various embodiments of the present disclosure provide systems, methods, electronic devices and computer program products for identifying a re-routed transaction.

In an embodiment, a computer-implemented method is disclosed. The computer-implemented method performed by a processor includes retrieving a plurality of transaction windows from a transaction database. Each transaction window of the plurality of transaction windows includes a transaction declined under a restricted Merchant Category Code (MCC) and each transaction window is associated with a respective payment instrument. The method includes accessing a plurality of features associated with each transaction of each transaction window from the transaction database. The plurality of features includes a sequential merchant similarity value with respect to a previously generated sequential restricted MCC merchant embedding, a graph based merchant similarity value with respect to a previously generated graph based restricted MCC merchant embedding, a sequential card similarity value with respect to a previously generated sequential risky card embedding, a graph based card similarity value with respect to a previously generated graph based risky card embedding, and a sequential merchant MCC similarity value with respect to a previously generated sequential restricted MCC embedding. The method includes generating an input dataset by appending the plurality of features to each associated transaction for each transaction of each transaction window of the plurality of transaction windows. The method includes predicting an output dataset including a plurality of reconstructed transaction windows based on feeding the input dataset to a trained neural network model. The method includes computing a corresponding reconstruction loss value for each transaction of each transaction window. A reconstruction loss value for an individual transaction is computed by comparing the individual transaction with a corresponding reconstructed transaction. The method includes comparing the corresponding reconstruction loss value for each transaction of each transaction window with a pre-determined threshold value. If a corresponding reconstruction loss value for a transaction of a transaction window is higher than the pre-determined threshold value, the method includes identifying the transaction as a re-routed transaction corresponding to the transaction declined under the restricted MCC of the transaction window.

In another embodiment, a system is disclosed. The system includes a communication interface, a memory including executable instructions, and a processor communicably coupled to the communication interface. The processor is configured to execute the executable instructions to cause the system to at least retrieve a plurality of transaction windows from a transaction database. Each transaction window of the plurality of transaction windows includes a transaction declined under a restricted Merchant Category Code (MCC) and each transaction window is associated with a respective payment instrument. The system is caused to access a plurality of features associated with each transaction of each transaction window from the transaction database. The plurality of features includes a sequential merchant similarity value with respect to a previously generated sequential restricted MCC merchant embedding, a graph based merchant similarity value with respect to a previously generated graph based restricted MCC merchant embedding, a sequential card similarity value with respect to a previously generated sequential risky card embedding, a graph based card similarity value with respect to a previously generated graph based risky card embedding, and a sequential merchant MCC similarity value with respect to a previously generated sequential restricted MCC embedding. The system is further caused to generate an input dataset by appending the plurality of features to each associated transaction for each transaction of each transaction window of the plurality of transaction windows. The system is further caused to predict an output dataset including a plurality of reconstructed transaction windows based on feeding the input dataset to a trained neural network model. The system is further caused to compute a corresponding reconstruction loss value for each transaction of each transaction window. A reconstruction loss value for an individual transaction is computed by comparing the individual transaction with a corresponding reconstructed transaction. The system is further caused to compare the corresponding reconstruction loss value for each transaction of each transaction window with a pre-determined threshold value. If a corresponding reconstruction loss value for a transaction of a transaction window is higher than the pre-determined threshold value, the system is further caused to identify the transaction as a re-routed transaction corresponding to the transaction declined under the restricted MCC of the transaction window.

In yet another embodiment, a computer-implemented method is disclosed. The computer-implemented method performed by a processor includes retrieving a transaction window associated with a payment card from a transaction database. First transaction of the transaction window is a transaction declined under a restricted MCC. The method includes accessing a plurality of transactional features, a plurality of card features, and a plurality of merchant features associated with each transaction of the transaction window from the transaction database. The plurality of merchant features includes a sequential merchant similarity value with respect to a previously generated sequential restricted MCC merchant embedding, a graph based merchant similarity value with respect to a previously generated graph based restricted MCC merchant embedding, and a sequential merchant MCC similarity value with respect to a previously generated sequential restricted MCC embedding. The plurality of card features includes a sequential card similarity value with respect to a previously generated sequential risky card embedding, a graph based card similarity value with respect to a previously generated graph based risky card embedding. The method includes generating an input dataset by appending the plurality of transactional features, the plurality of card features, and the plurality of merchant features to each associated transaction for each transaction of the transaction window. The method includes predicting an output dataset including a reconstructed transaction window based on feeding the input dataset to a previously trained Long Short-Term Memory (LSTM) Autoencoder with an attention layer model. The method includes computing a corresponding reconstruction loss value for each transaction of the transaction window by comparing each transaction of the input dataset with each corresponding reconstructed transaction of the reconstructed transaction window of the output dataset. The method includes comparing the corresponding reconstruction loss value for each transaction of the transaction window with a pre-determined threshold value. The threshold value is previously determined based on a plurality of validation phase reconstruction loss values computed after training of the LSTM autoencoder with attention layer model during a validation phase. A validation dataset utilized for computing plurality of validation phase reconstruction loss values includes a plurality of transaction windows including at least one re-routing transaction window. The at least one re-routing transaction window further includes at least one declined transaction under restricted MCC and a corresponding re-routed transaction. If a corresponding reconstruction loss value for a transaction is higher than the pre-determined threshold value, the method includes identifying the transaction as a re-routed transaction corresponding to the transaction declined under the restricted MCC.

BRIEF DESCRIPTION OF THE FIGURES

For a more complete understanding of example embodiments of the present technology, reference is now made to the following descriptions taken in connection with the accompanying drawings in which:

FIG. 2 is a simplified block diagram of a system, in accordance with one embodiment of the present disclosure;

FIGS. 4A to 4D, collectively, represent generation of a plurality of sequential merchant embeddings for all merchants retrieved from a transaction database using a sequential engine, in accordance with an example embodiment;

FIGS. 5A and 5B, collectively, represent generation of a plurality of sequential card embeddings for all cards retrieved from the transaction database, in accordance with an embodiment of the present disclosure;

FIGS. 6A and 6B, collectively, represent generation of a plurality of sequential MCC embeddings for all MCCs retrieved from the transaction database using the sequential engine, in accordance with one embodiment of the present disclosure;

FIGS. 12A and 12B, collectively, represent a flow diagram of a computer-implemented method for identifying a re-routed transaction, in accordance with an example embodiment;

FIGS. 13A and 13B, collectively, represent a flow diagram of another computer-implemented method for identifying a re-routed transaction, in accordance with an example embodiment.

Figure 1:
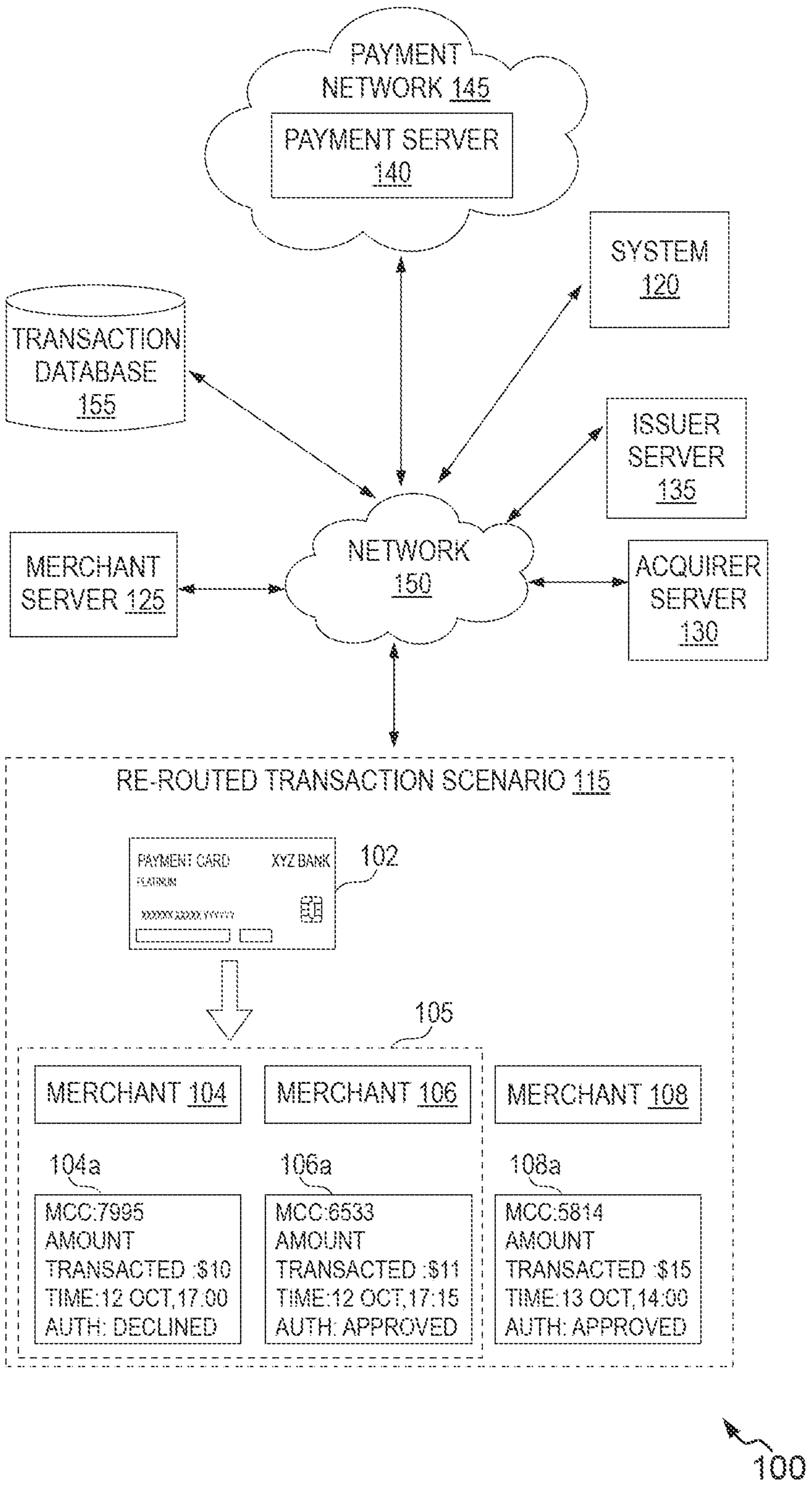
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment instrument", used throughout the description, refers to a paper-based or electronic payment means or other payment means used to initiate the transfer of funds. Example of the payment instruments includes payment accounts, payment cards/cards (such as, debit card, credit card, etc.), digital payment cards, e-wallets, etc.

The term "payment network", used throughout the description, refers to a network or collection of systems used for the transfer of funds through the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by such as Mastercard®.

The term "issuer", used throughout the description, refers to a financial institution normally called as an "issuer bank" or "issuing bank" in which an individual or an institution may have an account. The issuer also issues a payment card, such as a credit card or a debit card, etc. Further, the issuer may also facilitate online banking services such as electronic money transfer, bill payment, etc., to the account holders through a server system called as "issuer server" throughout the description.

The term "merchant", used throughout the description, generally refers to a seller, a retailer, a purchase location, an organization, or any other entity that is in the business of selling goods or providing services either in online or offline manner, and it can refer to either a single business location, or a chain of business locations of the same entity.

The term "acquirer", used throughout the description, refers to a financial institution that is part of the financial payment system and normally called as an "merchant bank" or the "acquiring bank" or "acquirer bank" or simply "acquirer" in which the merchant first establishes an account to accept the payment. The acquirer may also facilitate online services such as electronic money transfer to the account holders i.e., merchants through a server system called as "acquirer server" throughout the description.

The term "Merchant Category Code (MCC)", used throughout the description, refers to a four-digit code uniquely assigned to each merchant by the acquirer as part of the account process setup. The MCC is used to classify the business by the type of goods or services the merchant provides such that the issuer can identify what type of transaction its cardholder is performing, from what website and in which country.

Further, the term "restricted MCC", used throughout the description, refers to specific high-risk merchant categories as defined by payment card associations for risk monitoring purposes. High-risk merchant category codes belong to the industries that predominantly generate the highest levels of cardholder disputes, represent higher levels of financial risk to the issuers and/or create additional brand risk for regulatory reasons. An example of the restricted MCC is MCC 7995 allotted to online casino merchants in an effort to provide real-time risk monitoring and reporting. The term "restricted MCC" is alternatively referred as "MCC 7995" throughout the description without deviating from the scope of the disclosure.

The term "re-routed transaction", used throughout the description, refers to a transaction that is approved after a transaction under a restricted MCC e.g., MCC 7995 is declined. A re-routing transaction possesses an MCC other than the restricted MCC by hiding the merchant identity in order to get approval over the declined transaction. A re-routing of a transaction may occur within a short period of time after a transaction under the restricted MCC is declined. A re-routing transaction may request to process a similar transaction amount to that of the transaction declined under the restricted MCC. Thus, either the merchant can be miscoded or there can be collusion with other merchants to get the declined transaction approved via a re-routed transaction.

Overview

Various example embodiments of the present disclosure provide methods, systems, user devices and computer program products for identifying a re-routed transaction that is approved after a corresponding transaction under a restricted MCC is declined, such as by establishing semantic relationships between the merchants and identifying the context upon which a transaction is considered to be re-routed transaction through the use of artificial intelligence and deep learning techniques.

In various example embodiments, the present disclosure describes a system that facilitates identification of a transaction declined under a restricted MCC and its corresponding approved re-routed transaction. The system includes at least a processor and a memory. The processor is configured to retrieve a plurality of transaction windows from a transaction database associated with a server system such as a payment server. Each transaction window of the plurality of transaction windows is associated with a respective payment instrument (e.g., a payment card) and includes a transaction declined under a restricted MCC such as MCC 7995. In at least one embodiment, each first transaction of each transaction window is a transaction declined under a restricted MCC for which a corresponding re-routed transaction is to be identified.

The processor is configured to access a plurality of features associated with each transaction of each transaction window from the transaction database. The plurality of features further includes a plurality of transactional features, a plurality of payment card/card features, and a plurality of merchant features associated with each transaction. Some non-exhaustive examples of the plurality of transactional features include a transaction amount, a transaction status, a transaction time, a transaction type and the like. Some non-exhaustive examples of the plurality of merchant features include a plurality of sequential merchant embeddings, a plurality of graph based merchant embeddings, a sequential merchant similarity value with respect to a previously generated sequential restricted MCC merchant embedding, a graph based merchant similarity value with respect to a previously generated graph based restricted MCC merchant embedding, a sequential merchant MCC similarity value with respect to a previously generated sequential restricted MCC embedding and the like. Some non-exhaustive examples of the plurality of card features include a plurality of sequential cad embeddings, a plurality of graph based card embeddings, a number of restricted MCC transactions processed using the payment card, an approval rate for the number of restricted MCC transactions processed using the payment card, a sequential card similarity value with respect to a previously generated sequential risky card embedding, a graph based card similarity value with respect to a previously generated graph based risky card embedding and the like. A respective cosine similarity function is used for computing the sequential merchant similarity value, the graph based merchant similarity value, the graph based card similarity value, the sequential card similarity value and the sequential merchant MCC similarity value.

In one embodiment, the processor is configured to generate an input dataset by appending the plurality of features to each associated transaction for each transaction of each transaction window of the plurality of transaction windows. The input dataset is fed to a trained neural network model configured to predict a plurality of reconstructed transaction windows referred as an output dataset. In one embodiment, the neural network model trained to predict the plurality of reconstructed transaction windows from the plurality of transaction windows is a Long Short-Term Memory (LSTM) Autoencoder with an attention layer. The processor is configured to compute a corresponding reconstruction loss value for each transaction of each transaction window. A mean squared error between a plurality of features of an individual transaction and a plurality of reconstructed features of a corresponding reconstructed transaction is calculated to compute the corresponding reconstructed loss value for the individual transaction.

In one embodiment, the processor is configured to compare the corresponding reconstruction loss value for each transaction of each transaction window with a pre-determined threshold value. The threshold value is previously determined based on a plurality of validation phase reconstruction loss values computed after training of the neural network model during a validation phase. Further, a validation dataset utilized for computing the plurality of validation phase reconstruction loss values includes a plurality of transaction windows including at least one re-routing transaction window. The at least one re-routing transaction window further includes at least one declined transaction under a restricted MCC and a corresponding re-routed transaction.

In one embodiment, if a corresponding reconstruction loss value for a transaction of a transaction window is higher than the pre-determined threshold value, the processor is configured to identify the transaction as a re-routed transaction corresponding to the transaction declined under the restricted MCC of the transaction window.

Internet gambling is restricted in a lot of geographies and therefore a lot of re-routing scenarios occur in the payment ecosystem which are very tedious and difficult to identify as the rules are very rigid. For example, the rules account only for recency of transaction and comparable transaction amounts. For instance, if a subsequent transaction after a decline on an MCC 7995 encoded merchant is approved within the same day and in a range of ±10% of the declined amount, such transaction is flagged as suspicious merchant re-routing transaction. This method is prone to errors. Further, a normal deep learning sequence model is difficult to build upon as the event of a re-routing transaction is extremely rare and it is difficult to build any classification model with such limited information. The little amount of labeled data available is noisy and prone to false flags. Various embodiments of the present disclosure offer multiple advantages and technical effects. A deep anomaly detection model is trained that helps tackle the lack of label and is capable of learning expressive normality/abnormality representations with a small amount of labelled anomaly data. The model is trained to capture conditional and group based anomaly i.e., an MCC 7995 declined transaction followed by a suspicious re-routing transaction.

The solution takes two-fold approach i.e., it first generates probable merchant pair involved in transaction re-routing followed by finding a pair of such transactions. This two-fold approach reduces the search complexity to find out a re-routed transaction. Thus, the embodiments not only capture re-routing merchants but also help to identify other re-routing patterns such as framing a pair of transaction as graph analytics. Further, the present disclosure establishes semantic relationship between merchants, which helps in detection of miscoded merchants which is not possible using traditional merchant similarity techniques like MCC, industry, volume etc.

Various example embodiments of the present disclosure are described hereinafter with reference to FIGS. 1 to 14.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, identifying re-routed transactions for multiple payment instruments (e.g., payment cards) of a user. Examples of the payment instruments may include, but are not limited to, payment cards (such as, credit cards, debit cards, virtual payment cards, etc.), payment accounts, electronic wallets, etc. The environment 100 generally includes a re-routed transaction scenario 115, a system 120, an issuer server 135, a payment network 145 including a payment server 140, a merchant server 125, an acquirer server 130, and a transaction database 155 each connected to, and in communication with (and/or with access to) a network 150. The network 150 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 150 in accordance with various wired and wireless communication protocols, such as Transmission Control Protocol and Internet Protocol (TCP/IP), User Datagram Protocol (UDP), 2$^{nd}$ Generation (2G), 3rd Generation (3G), 4$^{th}$ Generation (4G), 5$^{th}$ Generation (5G) communication protocols, Long Term Evolution (LTE) communication protocols, or any combination thereof. The network 150 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof. For example, the network 150 may include multiple different networks, such as a private network made accessible by the payment network 145 to the issuer server 135, the merchant server 125, the acquirer server 130 and the transaction database 155 and separately, a public network (e.g., the Internet) through which the system 120, the payment server 140, the issuer server 135, the merchant server 125, the acquirer server 130 and the transaction database 155 may communicate.

The re-routed transaction scenario 115 is shown to include a payment instrument for example, a payment card 102 using which a plurality of transactions is performed. A respective transaction information 104*a*, 106*a*, and 108*a* respectively associated with one or more merchants such as a merchant 104, a merchant 106, and a merchant 108 is also included. It is exemplarily shown in the FIG. 1 that a payment instrument is represented as the payment card 102. However, the payment instrument may also include a combination of e-wallet application, virtual payment card, payment account, etc. The payment instrument possessed by a user (not shown) may be associated with the issuer server 135. The transaction information 104*a* includes an MCC 7995 for the merchant 104, a transaction amount being $10, a time of the transaction being 12$^{th}$ October, 17:00 μm and an authorization status/transaction status being declined. When the MCC 7995 encoded merchant 104 receives a transaction request via an associated merchant server such as the merchant server 125 for processing the transaction amount $10, the transaction request is forwarded by the merchant server 125 to the acquirer server 130 for further processing. The acquirer server 130 sends the transaction request to the issuer server 135 for performing the final authorization and authentication of the transaction request via the payment server 140 associated with the payment network 145.

The issuer server 135 is enabled to block or decline a high-risk transaction request at the interchange BIN level based on a variety of parameter settings such as MCC, country code, ECI indicator and the like. Some examples of identifying a high-risk transaction request based on MCCs include MCC 7995 (online gambling services), MCC 5993 (Tobacco, cigarettes etc.), MCC 7273 (dating services), MCC 5122 (Drugs, proprietaries and sundries) and the like. The high-risk MCCs are also referred as restricted MCCs alternatively. As shown, the transaction status is declined by the issuer server 135 for the transaction request received from the merchant 104 encoded under MCC 7995. Although, the disclosure is explained throughout using an example of MCC 7995 declined transaction and identifying its corresponding re-routed transaction, various embodiments of the present disclosure are capable of identifying a re-routed transaction corresponding to a transaction declined under any high-risk or restricted MCC other than MCC 7995.

The transaction information 106*a* associated with the merchant 106 includes an MCC 6533, a transaction amount being $11, a transaction time being 12$^{th}$ October, 17:15 pm and an authorization status being approved. As can be seen, the transaction request is sent using an MCC other than MCC 7995 within only a short span of the time and for a similar transaction amount after the transaction under MCC 7995 for the merchant 104 is declined by the issuer server 135 for the payment card 102. As the MCC 6533 is not a restricted MCC, the issuer server 135 has approved the transaction request. This is an example of a re-routed transaction approved after a declined transaction under a restricted MCC (see, dotted box 105). Explained above is a scenario when the merchant 106 is miscoded under an MCC (i.e., MCC 6533) other than a restricted MCC, such as MCC 7995 of the merchant 104. Alternatively, the merchant 104 may have unethically collaborated with merchant 106 in order to get an approval of the transaction that got previously declined by the issuer server 135.

The re-routed transaction scenario 115 also includes one more transaction information 108*a* associated with the merchant 108 including an MCC 5814 (merchants of fast-food restaurants), a transaction amount being $15, a transaction time being 13$^{th}$ October, 14:00 pm and an authorization status being approved. As can be seen, there are two approved transactions, one miscoded under MCC 6533 and another rightly coded under MCC 5814 after the MCC 7995 declined transaction of the merchant 104. Therefore, it would be incorrect to identify each transaction as a re-routed transaction after a declined transaction under the restricted MCC. Also, there may be multiple declined transactions under restricted MCCs and their corresponding re-routed transactions.

Various embodiments of the present disclosure provide ways to identify a correct re-routed transaction approved out of a plurality of approved transactions after a declined transaction under a restricted MCC using the system 120. The system 120 may be configured to perform one or more of the operations described herein. In one example, the system 120 is embodied in the payment network 145. In general, the system 120 may be configured to utilize a trained neural network model to identify a re-routed transaction corresponding to a declined transaction under a restricted MCC. The system 120 is configured to not only identify a fraudulent merchant but also flag the specific transactions which are re-routing ones by developing the context of why a transaction is considered to be the re-routed one.

The system 120 includes a processor and a memory. The system 120 is in communication with the transaction database 155 via a communication interface over the network 150. In one embodiment, the transaction database 155 is integrated within the payment server 140 associated with the payment network 145. In general, the system 120 is configured to retrieve a plurality of transaction windows from the transaction database 155. Each transaction window of the plurality of transaction windows includes a transaction declined under a restricted MCC and each transaction window is associated with a respective payment instrument. The system 120 is configured to append a plurality of features previously generated to each associated transaction for each transaction of each transaction window. The plurality of features is accessed by the system 120 from the transaction database 155. The generation of the plurality of features is explained in detail later. The system 120 is configured to predict an output dataset that includes a plurality of reconstructed transaction windows based on feeding the input dataset to a trained neural network model. The system 120 is configured to compare a corresponding reconstruction loss value computed for each transaction of each transaction window with a pre-determined threshold value. Thereafter, the system 120 is configured to identify a transaction as a re-routed transaction corresponding to the transaction declined under the restricted MCC of the transaction window, if a corresponding reconstruction loss value for a transaction of a transaction window is higher than the pre-determined threshold value.

The system 120 is a separate part of the environment 100 and may operate apart from (but still in communication with, for example, via the network 150) the issuer server 135, the acquirer server 130, the payment server 140, the merchant server 125, and the transaction database 155. However, in other embodiments, the system 120 may actually be incorporated, in whole or in part, into one or more parts of the environment 100, for example, the payment server 140 or the issuer server 135 or the acquirer server 130. In addition, the system 120 should be understood to be embodied in at least one computing device in communication with the network 150, which may be specifically configured, via executable instructions, to perform as described herein, and/or embodied in at least one non-transitory computer-readable media. In one embodiment, the payment server 140 associated with the payment network 145 is shown. The payment network 145 may be used by the payment cards issuing authorities as a payment interchange network. Examples of payment interchange networks include, but are not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Referring now to FIG. 2, a simplified block diagram of system 200, is shown, in accordance with an embodiment of the present disclosure. The system 200 is similar to the system 120. In some embodiments, the system 200 is embodied as a cloud-based and/or SaaS-based (software as a service) architecture. In some embodiments, the system 200 may be implemented in a server system. In one embodiment, the system 200 is a part of a payment network 145 or is integrated within the payment server 140. In another embodiment, the system 200 may be embodied within the acquirer server 130 or the issuer server 135.

The system 200 includes a computer system 202 and a database 204. The computer system 202 includes at least one processor 206 for executing instructions, a memory 208, a communication interface 210, and a user interface 216 that communicate with each other via a bus 212.

In some embodiments, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store a plurality of transactional features, a plurality of card features, and a plurality of merchant features associated with each transaction of each transaction window of the plurality of transaction windows. In one embodiment, the transaction database 155 of FIG. 1 is embodied within the database 204. In another embodiment, the transaction database 155 is a separate entity communicably coupled with the database 204.

The processor 206 includes suitable logic, circuitry, and/or interfaces to execute operations for performing various embodiments of the invention. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the system 200, as described herein. In another embodiment, the memory 208 may be realized in the form of a database server or cloud storage working in conjunction with the system 200, without departing from the scope of the present disclosure.

The processor 206 is operatively coupled to the communication interface 210 such that the processor 206 is capable of communicating with a remote device 218 such as, the transaction database 155, the payment server 140, the issuer server 135, the acquirer server 130, the merchant server 125, or communicated with any entity connected to the network 150 (as shown in FIG. 1).

It is noted that the system 200 as illustrated and hereinafter described is merely illustrative of an apparatus that could benefit from embodiments of the present disclosure and, therefore, should not be taken to limit the scope of the present disclosure. It is noted that the system 200 may include fewer or more components than those depicted in FIG. 2.

In one embodiment, the processor 206 includes a feature extraction engine 220, a sequence engine 222, a Heterogeneous Graph Convolutional Network (HGCN) engine 224, a Principal Component Analysis (PCA) engine 226, a similarity computation engine 228, a reconstruction loss computation engine 230 and a trained neural network engine 232. It should be noted that the components, described herein, can be configured in a variety of ways, including electronic circuitries, digital arithmetic and logic blocks, and memory systems in combination with software, firmware, and embedded technologies. The processor 206 is configured to retrieve a plurality of transaction windows associated with a respective payment instrument from the transaction database 155.

The feature extraction engine 220 includes suitable logic and/or interfaces for accessing a plurality of features associated with each transaction from the transaction database 155 of FIG. 1. The plurality of features of a transaction is generated during training phase of the neural network engine 232 and stored in the transaction database 155 for later extraction during the validation phase and evaluation phase/execution phase. The feature extraction engine 220 is configured to extract a plurality of transactional features, a plurality of card features, and a plurality of merchant features associated with each transaction of the transaction window from the transaction database 155. Some non-exhaustive examples of the plurality of transactional features include a transaction amount, a transaction status, a transaction time, a transaction type and the like. Some non-exhaustive examples of the plurality of card features include a number of restricted MCC/MCC 7995 transactions processed using the payment card, and an approval rate for the number of restricted MCC transactions processed using the payment card and the like.

The sequence engine 222 (hereinafter alternatively referred to as "sequence model 222") includes suitable logic and/or interfaces for generating corresponding sequential merchant embeddings for all merchants retrieved from the transaction database 155. The sequential merchant embeddings also include a plurality of sequential restricted MCC merchant embeddings generated using the sequence engine 222. Thereafter, a sequential restricted MCC merchant embedding is generated for training the neural network engine 232 by computing a weighted average (based on transaction count) of the plurality of sequential restricted MCC merchant embeddings. In an example embodiment, the sequence engine 222 is trained based on word2vec sequence model to generate the sequential merchant embeddings. The generation of the sequential merchant embeddings is explained later with reference to FIGS. 4A to 4D.

The processor 206 is configured to generate corresponding sequential card embeddings for all cards retrieved from the transaction database 155 using a weighted average of the sequential merchant embeddings. The processor 206 is further configured to identify a plurality of risky cards having performed a higher number of restricted MCC (e.g., gambling) transactions compared to a predefined restricted MCC threshold value. For example, a set of cards having 50% or more share of restricted MCC transactions are considered as risky cards. Thereafter, a sequential risky card embedding is generated for training the neural network engine 232 by computing an average of the plurality of sequential risky card embeddings associated with the plurality of risky cards.

The sequence engine 222 further includes suitable logic and/or interfaces for generating corresponding sequential MCC embeddings for all MCCs retrieved from the transaction database 155. Thereafter, a sequential restricted MCC embedding is generated for training the neural network engine 232.

The Heterogenous Graph Convolutional Network (HGCN) engine 224 (hereinafter alternatively referred to as "HGCN model 224") includes suitable logic and/or interfaces for generating corresponding graph based merchant embeddings for all merchants retrieved from the transaction database 155 and for simultaneously generating corresponding graph based card embeddings for all cards retrieved from the transaction database 155. The graph based merchant embeddings also include a plurality of graph based restricted MCC merchant embeddings generated using the HGCN engine 224. Thereafter, a graph based restricted MCC merchant embedding is generated for training the neural network engine 232 by computing a weighted average (based on transaction count) of the plurality of graph based restricted MCC merchant embeddings.

The processor 206 is further configured to identify a plurality of risky cards having performed a higher number of restricted MCC transactions compared to a predefined restricted MCC threshold value. For example, a set of cards having 70% or more share of restricted MCC transactions are considered as risky cards. Thereafter, a graph based risky card embedding is generated for training the neural network engine 232 by computing an average of the plurality of graph based risky card embeddings associated with the plurality of risky cards.

The Principal Component Analysis (PCA) engine 226 includes suitable logic and/or interfaces for reducing the dimensionality of large datasets, by transforming a large set of variables into a smaller one that still contains most of the information from the large set. More specifically, the PCA engine 226 is configured to reduce size of the sequential merchant embeddings, the graph based merchant embeddings, the sequential card embeddings, and the graph based merchant embeddings. For example, merchant embedding vector of initial size 100 is reduced to dimension 5 using PCA engine 226. Similarly, the card embedding vector of initial size 100 is reduced to dimension 5 using the PCA engine 226.

The similarity computation engine 228 includes suitable logic and/or interfaces for computing a sequential merchant similarity value with respect to the previously generated sequential restricted MCC merchant embedding, a graph based merchant similarity value with respect to the previously generated graph based restricted MCC merchant embedding, a sequential card similarity value with respect to the previously generated sequential risky card embedding, a graph based card similarity value with respect to the previously generated graph based risky card embedding, and a sequential merchant MCC similarity value with respect to the previously generated sequential restricted MCC embedding. In one embodiment, the similarity computation engine 228 includes a cosine similarity function for computing the sequential merchant similarity value, the graph based merchant similarity value, the graph based card similarity value, the sequential card similarity value and the sequential merchant MCC similarity value. In various embodiments, the similarity computation engine 228 is configured to compute the similarity values using Euclidian Distance, Manhattan Distance, Minkowski Distance, Jaccard similarity and the like.

The plurality of features generated using various engines and methods as explained hereinabove are utilized to create a training dataset, a validation dataset and an input dataset during various phase of the neural network engine 232 (hereinafter alternatively referred to as "neural network model 232") being a training phase, a validation phase and an evaluation phase, respectively.

During the training phase, the processor 206 is configured to generate a training dataset by appending the plurality of features to each associated transaction for each transaction of each transaction window of the plurality of transaction windows retrieved from the transaction database 155. Each transaction window of the plurality of transaction windows is generated without including a re-routed transaction and a corresponding restricted MCC declined transaction. The neural network engine 232 is trained to predict a plurality of reconstructed transaction windows. In one embodiment, the trained neural network engine 232 is an anomaly detection model and is stored in the database 204. In the at least one embodiment, a Long Short-Term Memory (LSTM) Autoencoder with an attention layer is trained to predict the plurality of reconstructed windows corresponding to the plurality of transaction windows fed for training. In various embodiments, time series anomaly detection models such as Autoregressive Integrated Moving Average (ARIMA) model, HOLT-WINTERS model (exponential smoothing model) etc. may also be implemented for anomaly detection i.e., identification of a re-routed transaction.

After training, during the validation phase, the processor 206 is configured to generate a validation dataset by appending corresponding plurality of features to a plurality of transaction windows that includes at least one re-routing transaction window. The at least one re-routing transaction window further includes at least one declined transaction under a restricted MCC and a corresponding re-routed transaction. The validation dataset is fed to the trained neural network engine 232 configured to predict a plurality of reconstructed transaction windows for the validation phase.

During the validation phase, the reconstruction loss computation engine 230 is configured to compute a plurality of validation phase reconstruction loss values and store in the database 204. A validation phase reconstruction loss value for an individual transaction is computed by comparing the individual transaction with a corresponding reconstructed transaction during the validation phase. The processor 206 is configured to determine a threshold value based on the plurality of validation phase reconstruction loss values. The threshold value is later utilized during the evaluation phase of the neural network engine 232 for performing anomaly detection.

During the evaluation phase, the processor 206 is configured to generate the input dataset by appending the plurality of features to each associated transaction for each transaction of each transaction window of the plurality of transaction windows retrieved from the transaction database 155. Each transaction window is associated with a respective payment instrument. Each transaction window of the plurality of transaction windows includes a transaction declined under a restricted MCC for which a re-routed transaction is to be identified. The input dataset is fed to the trained neural network engine 232 for predicting corresponding plurality of reconstructed transaction windows.

During the evaluation phase, the reconstruction loss computation engine 230 is configured to compute a plurality of reconstruction loss values/evaluation phase reconstruction loss values. As explained above, a reconstruction loss value for an individual transaction is computed by comparing the individual transaction with a corresponding reconstructed transaction during the validation phase. The reconstruction loss computation engine 230 includes suitable logic and/or interfaces for computing the reconstruction loss value. In one embodiment, a mean squared error between a plurality of features of a transaction and a plurality of reconstructed features of a reconstructed transaction is calculated to compute the corresponding reconstructed loss value for the transaction.

During the evaluation phase, the processor 206 is configured to compare the corresponding reconstruction loss value for each transaction of each transaction window with the pre-determined threshold value. As explained hereinabove, the threshold value is determined during the validation phase of the neural network engine 232. Thereafter, if a corresponding reconstruction loss value for a transaction of a transaction window is higher than the pre-determined threshold value, the processor 206 is configured to identify the transaction as a re-routed transaction corresponding to the transaction declined under the restricted MCC of the transaction window.

Figure 3:
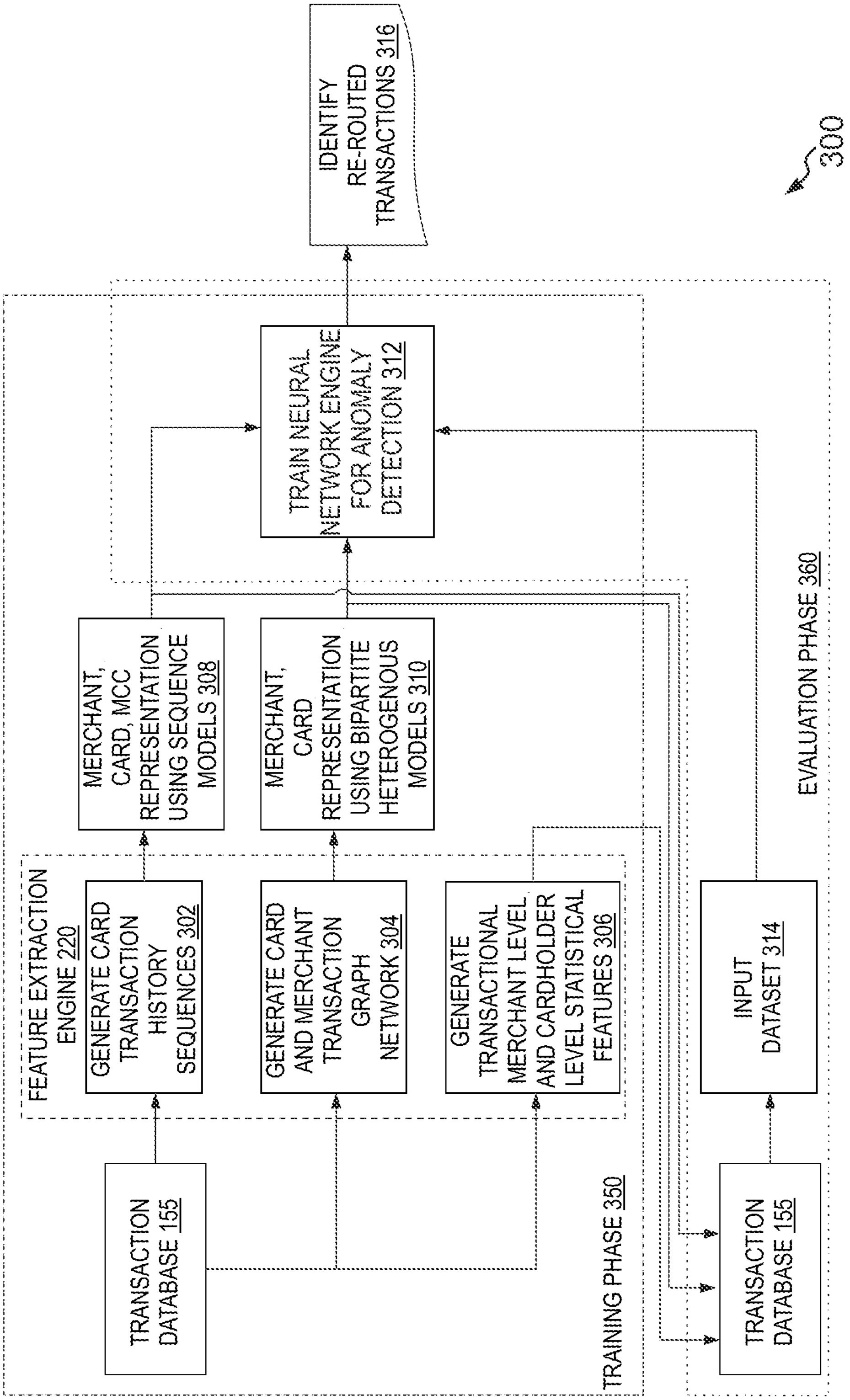
FIG. 3 is a schematic block diagram representation of training and evaluation processes of a neural network engine, in accordance with an example embodiment.

Referring now to FIG. 3, a schematic block diagram representation 300 of training and evaluation processes of the neural network engine 232, is shown, in accordance with an embodiment of the present disclosure. For building a model i.e., the neural network engine 232 that is able to predict outputs at transaction level, specific features which are good at transaction level and are able to represent the merchant in specific manner are required. Features which represent cards involved in such re-routing scenarios are also required. The transaction database 155 is accessed by the processor 206 to generate different flavors of the features.

At first, a transaction history sequence of each card is generated (see, 302) by extracting associated transaction information of each card from the transaction database 155 of FIG. 1. Thereafter, card and merchant transaction graph network is generated by extracting associated transaction information of each card and each merchant from the transaction database 155 (see, 304). Next, transactional level, merchant level and card level statistical features are generated by extracting associated transaction information of each card, each merchant and each associated transaction from the transaction database 155 (see, 306). Some non-exhaustive examples of the transactional features include transaction amount, transaction type, transaction time, transaction status, whether MCC of the transaction is a restricted MCC, domestic or international transaction, and the like. As shown, the feature extraction engine 220 is responsible to perform applicable feature extraction functions for training the sequence engine 222, the HGCN engine 224, and the neural network engine 232.

Next, the transaction history sequence of each card is utilized to train the sequence engine 222 for generating merchant, card and MCC representation/embeddings (i.e., the plurality of sequential merchant embeddings, the plurality of sequential card embeddings and the plurality of sequential MCC embeddings) (see, 308). Final embedding layer is used as a representation for each merchant. The patterns present in the transaction sequence of cards help to capture the semantic relation amongst them. The sequence engine 222 is trained to correctly identify whether the pairs are occurring in context. For example, if two merchants M1 and M2 are occurring in the context (neighbourhood) of a merchant M3, then it might be inferred that M1 and M2 are similar in nature. This is useful to identify re-routing merchants that might show similar embeddings to that of merchants with MCC 7995. The generation of sequential merchant embeddings is explained later in detail with reference to FIGS. 4A to 4D.

Further, the processor 206 is trained to generate the card embeddings for each card present in the transaction database 155. The card embeddings are generated as a weighted average (the weight being the transaction count) of embedding of all the merchants it transacted upon. The generation of sequential card embeddings is explained later in detail with reference to FIG. 5A and FIG. 5B. The sequence engine 222 is also trained to generate MCC representation/embeddings for all MCCs retrieved from the transaction database 155. The generation of sequential MCC embeddings is explained later in detail with reference to FIG. 6A and FIG. 6B.

In one embodiment, the card and merchant transaction graph network (see, 304) is a bipartite graph where all the nodes are merchants and cards and they are connected using the transactions which they made with each other. This graphical structure is fed to the HGCN engine 224 to generate merchant and card representation/embeddings (i.e., the plurality of graph based merchant embeddings and the plurality of graph based card embeddings) (see, 310). Such representation is able to capture topological structure and learning into the model. For example, if a card is getting a decline on an MCC 7995 and getting an approval on the neighbor node, it infers that they are in close proximity in terms of topological structure. The generation of graph based merchant embeddings and graph based card embeddings is explained later in detail with reference to FIG. 7A and FIG. 7B.

The embeddings of merchants, cards and MCCs generated using various models/engines are then stored as one or more features of the plurality of features of a transaction in the transaction database 155. In one embodiment, the PCA engine 226 of FIG. 2 is used to reduce dimensions of the embeddings and thereafter they are stored in the transaction database 155. Other transactional features are also stored in the transaction database 155 as one or more features of the plurality of features generated for a transaction. Additionally, the similarity computation engine 228 (not shown in FIG. 3) of FIG. 2 is utilized to compute corresponding similarity values with respect to the restricted MCC merchants, risky cards and restricted MCCs. The respective similarity values are also stored in the transaction database 155 as one or more features of the plurality of features of a transaction.

Once the plurality of features is generated, they are appended to each transaction as features to generate a training dataset for training the neural network engine 232 for anomaly detection (see, 312). In at least one embodiment, an LSTM Auto-encoder with attention architecture (hereinafter collectively referred as "LSTM") is trained to identify anomalies based on re-construction error. The neural network engine 232 is hereinafter alternatively referred to as the LSTM engine 232/LSTM model 232 without deviating from the scope of the disclosure. The LSTM based architecture enables to look at sequence of transactions while the attention layer helps to pay more attention to the suspicious decline (a decline that might lead to a subsequent approval). Also, the anomaly based method enables to extract normal/abnormal features with only few labels. Each input data point in a LSTM model is a 2-d matrix of time step x features. The training of the LSTM engine 232 is explained later in detail with reference to FIG. 8. A threshold value is determined by the processor 206 during the validation phase of the LSTM engine 232 based on the validation phase reconstruction loss values computed based on the reconstructed transactions during the validation phase as explained with reference to FIG. 2. Determination of the threshold value during the validation phase is explained later with reference to FIG. 9 and FIG. 10. The training phase of the LSTM engine 232 is marked with a dotted box 350. The evaluation phase of the LSTM engine 232 is marked with a dotted box 360.

Once the LSTM engine 232 is trained and the threshold value is determined, the processor 206 is configured to generate an input dataset for feeding into the trained LSTM engine 232 (see, 314). The input dataset is generated by appending the plurality of features accessed or extracted from the transaction database 155 to a transaction of a set of transactions forming a transaction window. First transaction of the transaction window is a transaction declined under a restricted MCC. A plurality of such transaction windows is generated for feeding into the trained LSTM engine 232. The LSTM engine 232 is configured to predict a plurality of corresponding reconstructed transaction windows. As explained with reference to FIG. 2, the reconstruction loss computation engine 230 is configured to compute a corresponding reconstruction loss value for each transaction of each transaction window by comparing each transaction of the input dataset with each corresponding reconstructed transaction of each reconstructed transaction window of the output dataset. Each reconstructed loss value is compared with the pre-determined threshold value and when a corresponding reconstructed loss value of a transaction is higher than the pre-determined threshold value, that transaction is identified/marked as a re-routed transaction corresponding to the declined transaction under the restricted MCC (see, 316). Evaluation phase of the LSTM engine 232 is explained later with reference to FIG. 11.

Figure 4A:
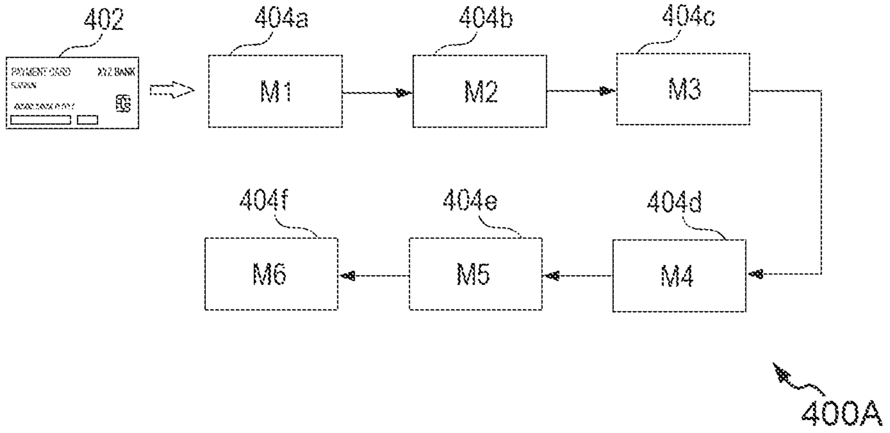

FIGS. 4A to 4D, collectively, represent generation of a plurality of sequential merchant embeddings for all merchants retrieved from the transaction database 155 using a sequential engine such as the sequence engine 222 of FIG. 2, in accordance with an example embodiment. FIG. 4A shows a representation 400A of a sequence of merchants for a card 402 as retrieved from the transaction database 155, in accordance with an example embodiment. The sequence of merchants corresponds to the number of transactions processed via the merchants for the card 402. Sequence based merchant embeddings lets the LSTM engine 232 understand the sequential relation between merchants which is the basis of merchant re-routing. For example, merchants acting as gambling merchants but not encoded under MCC 7995 show similarity to gambling merchants. Generating merchant representation using context is known as sequence contextual embeddings, similar to Word2vec. The sequence of merchants includes a plurality of merchants such as M1 404*a*, M2 404*b*, M3 404*c*, M4 404*d*, M5 404*e* and M6 404*f*. The sequence of merchants for the card 402 is analogous to a sequence of words in a sentence.

Figure 4B:
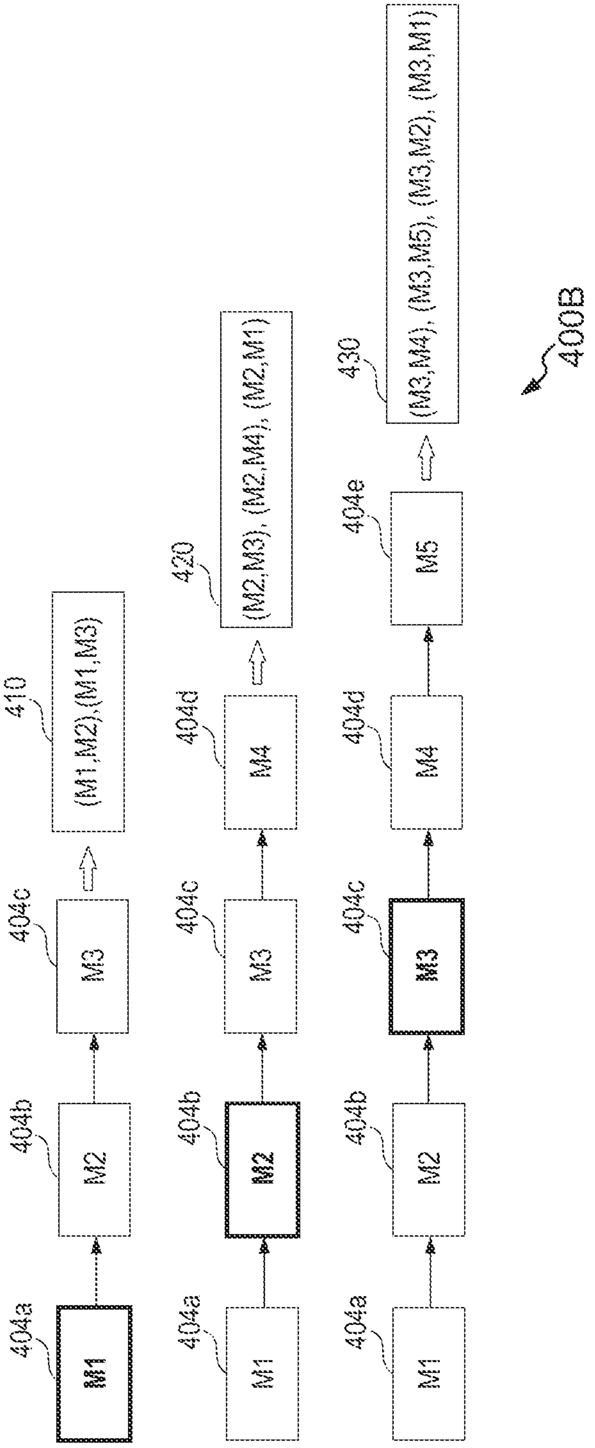

FIG. 4B shows a representation 400B for generating a sequential input dataset for training the sequence engine 222, in accordance with an example embodiment. More specifically, a plurality of pair of merchants (alternatively referred as "samples") is generated which are occurring in context of each other. For the sake of simplicity, the context window is chosen as two, i.e., 2 on left and 2 on right of a merchant for which the pair is to be generated. For example, as shown in FIG. 4*a*, there are only two merchants M2 404*b* and M3 404*c* available on the right to the merchant M1 404*a*. Therefore, the merchant pairs generated for the merchant M1 404*a* include (M1, M2) and (M1, M3) as shown by a dotted box 410. Similarly, a dotted box 420 includes the merchant pairs generated for the merchant M2 404*b* as (M2, M3), (M2, M4) and (M2, M1). Likewise, a dotted box 430 includes the merchant pairs generated for the merchant M3 404*c*.

In one example embodiment, the samples shown in the dotted boxes 410, 420 and 430 are positive samples. Negative samples are also generated to achieve efficient and better training of the sequence engine 222. In one embodiment, for each positive sample pair, 'k' (=5) negative samples are generated (using the concept of) from unigram distribution of words from vocabulary where more frequent words are likely to be selected as negative samples. For example, for a positive pair of merchants (M2, M3), 'k' negative samples (not shown) are generated as (M2, random_merchant_1), . . . (M2, random_merchant_5). The training of the sequence engine 222 to correctly identify the merchant pairs is explained hereinafter with reference to FIG. 4C.

Figure 4C:
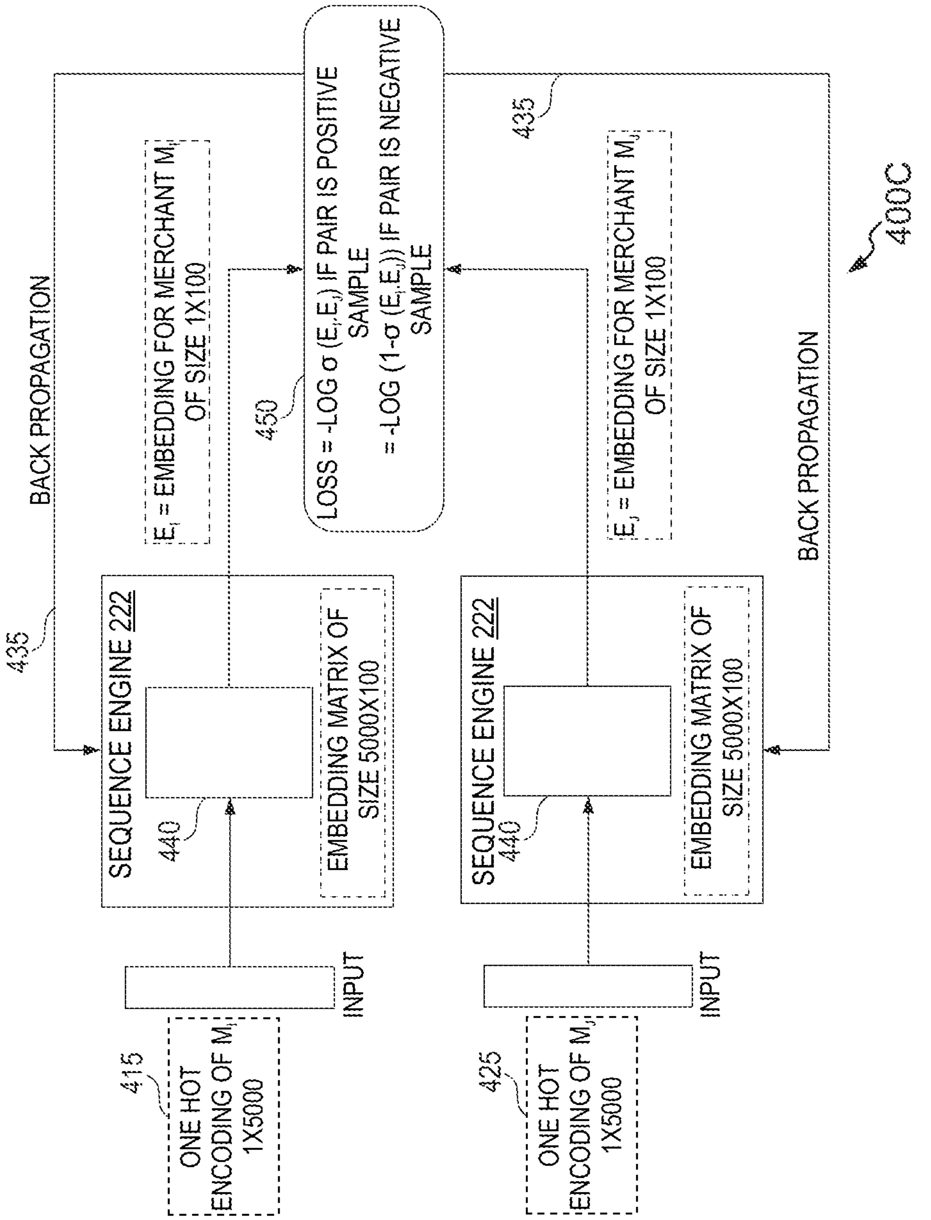

FIG. 4C shows a representation 400C of training the sequence engine 222, in accordance with an example embodiment. In an example scenario, a total of five thousand (5 k) unique merchants are retrieved from the transaction database 155 and embeddings of size 100 are to be generated. Each merchant of pair of merchants $m_i$ 415 and $m_j$ 425 is input sequentially to the sequence engine 222. An embedding matrix 440 of size 5000×100 shown inside the sequence engine 222 is used as a merchant embedding look up table. The embedding matrix 440 includes a plurality of features/embeddings i.e., 100 embeddings for the $m_i$ 415 being a merchant in the 'i'th row of the embedding matrix 440. The embedding matrix 440 includes a plurality of features/embeddings for the $m_j$ 425 being a merchant in the 'j'th row of the embedding matrix 440.

In other words, the embedding matrix 440 includes corresponding plurality of features/embeddings for each merchant of a positive merchant pair (e.g., (M1, M2), (M2, M4) and the like) present in each dotted box 410, 420 and 430 of FIG. 4B. Further, the embedding matrix 440 also includes the plurality of features for each merchant of the negative merchant pairs as explained with reference to FIG. 4B. In an example embodiment, a loss 450 is calculated by taking sigmoid (σ) of the dot product ($e_i \cdot e_j$) that signifies distance between embeddings of merchants $m_i$ and $m_j$. In one embodiment, the loss 450 is the cross entropy loss. Back propagation 435 method is used to train the weights of the embedding matrix 440 with the objective to maximise the distance between merchants of the negative merchant pairs and minimize the distance between the merchants of the positive merchant pair. Final embedding layer is used as a representation for each merchant.

FIG. 4D represents a final embedding matrix 400D, in accordance with an example embodiment. More specifically, the final embedding matrix 400D includes the plurality of sequential merchant embeddings (i.e., 100 embeddings 464) generated for five thousand (5 k) merchants 462 using back propagation 435 method to train the weights as explained above with reference to FIG. 4C. For the sake of simplicity, the merchants M1 404*a*, M2 404*b*, M3 404*c*, M4 404*d*, M5 404*e* and M6 404*f* of FIG. 4A are shown for each of which corresponding 100 embeddings 464 are generated. A row 460 is shown to represent columns marked as feature1, feature2 . . . feature100 associated with each merchant present in the corresponding rows.

In one embodiment, the processor 206 is configured to filter a plurality of sequential restricted MCC merchant embeddings from the plurality of sequential merchant embeddings. Thereafter, a sequential restricted MCC merchant embedding is computed by calculating a weighted average of the plurality of sequential restricted MCC merchant embeddings. The weighted average is based on the number of transactions for each merchant. For example, there are 10 merchants out of 5*k* merchants 462 having MCC 7995. One of the 10 such merchants may have 5 transactions, another may have 3 transactions and yet another may have 20 transactions. Based on such weighted average of embeddings of each merchant, MCC 7995 embedding is generated. Further, a cosine similarity function is utilized by the similarity computation engine 228 of FIG. 2 to compute a similarity value i.e., a sequential merchant similarity value with respect to the sequential restricted MCC merchant embedding. The reason of having the sequential merchant similarity value or other similarity values computed later from other embeddings as a feature input for the LSTM engine 232 is that if any one merchant has a very high similarity with MCC 7995, the similarity value will be very high such as 0.8 or 0.9. Such spiked-up numbers help to capture anomaly very efficiently during the evaluation phase of LSTM engine 232.

Figure 5A:
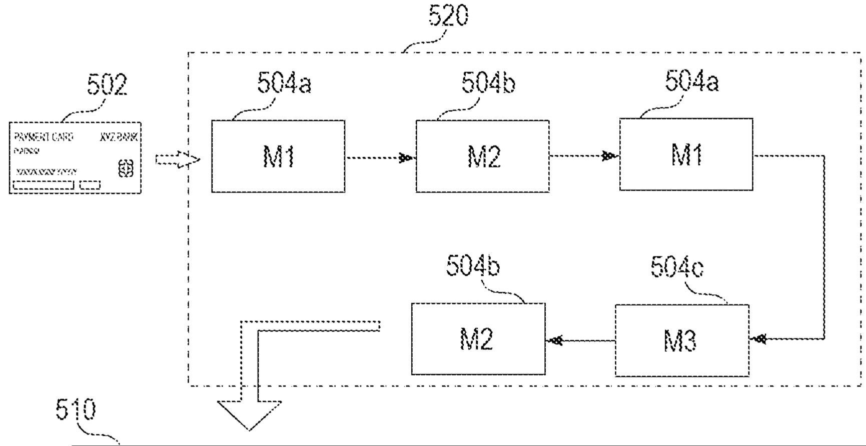

FIGS. 5A and 5B, collectively represent generation of a plurality of sequential card embeddings for all cards retrieved from the transaction database 155, in accordance with an example embodiment. FIG. 5A shows a representation 500A of a final embedding matrix 510 generated using the sequence engine 222 for a sequence of transactions (see, 520) of a card 502 as retrieved from the transaction database 155, in accordance with an example embodiment. More specifically, the final embedding matrix 510 includes the plurality of sequential merchant embeddings (i.e., 100 embeddings as represented by a header row 506) generated for merchants M1 504*a*, M2 504*b*, and M3 504*c*, belonging to the transaction sequence 520.

FIG. 5B shows a representation 500B of a final embedding matrix 540 generated from the final embedding matrix 510, in accordance with an example embodiment. The final embedding matrix 510 represents the plurality of sequential merchant embeddings. In order to generate a plurality of sequential card embeddings, first, a transaction share of each merchant is calculated from the transaction sequence 520 of FIG. 5A. As shown, there are two transactions from merchant M1 504*a*. There are two transactions from merchant M2 504*b*. There is one transaction from merchant M3 504*c*. Thereafter, a weighted average of embeddings of all the merchants based on their transaction count is calculated. As shown by a dotted box 530, weighted average of 0.4 based on two transactions share is multiplied to each feature/embedding of the merchant M1 504*a*. Similarly, weighted average of 0.2 based on one transaction share is multiplied to each feature/embedding of the merchant M3 504*c*. Accordingly, a final embedding matrix 540 for the card 502 is generated as shown where a row 515 includes the sequential card embeddings based on the calculation explained as hereinabove.

In one embodiment, the processor 206 is configured to identify a plurality of risky cards having performed a higher number of restricted MCC/gambling transactions or any restricted MCC transactions compared to a predefined restricted MCC threshold value. The processor 206 is further configured to filter a plurality of sequential risky card embeddings associated with the plurality of risky cards from the plurality of sequential card embeddings. Thereafter, a sequential risky card embedding is computed by calculating an average of the plurality of sequential risky card embeddings. Further, a cosine similarity function is utilized by the similarity computation engine 228 of FIG. 2 to compute a similarity value i.e., a sequential card similarity value with respect to the sequential risky card embedding.

Figure 6A:
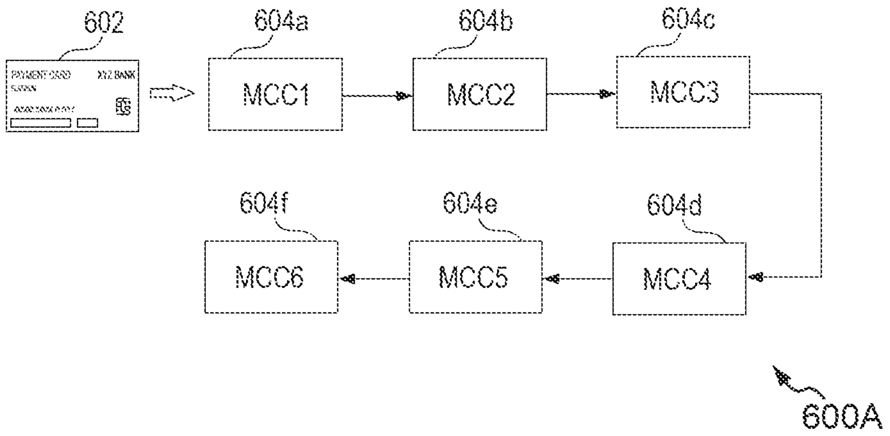

FIGS. 6A and 6B, collectively, represent generation of a plurality of sequential MCC embeddings for all MCCs retrieved from the transaction database 155 using a sequential engine such as the sequence engine 222 of FIG. 2, in accordance with an example embodiment. FIG. 6A shows a representation 600A of a sequence of MCCs for a card 602 as retrieved from the transaction database 155, in accordance with an example embodiment. The sequence of MCCs corresponds to the number of transactions processed via the associated merchants for the card 602. The sequence of MCCs includes a plurality of MCCs such as MCC1 604*a*, MCC2 604*b*, MCC3 604*c*, MCC4 604*d*, MCCS 604*e* and MCC6 604*f*. Positive pair of MCCs and negative pair of MCCs are generated as explained with reference to FIG. 4B. A back propagation method is used to train the weights of an embedding matrix with the objective to maximize the distance between MCC pairs from negative samples and minimize the distance between MCCs from positive MCC pairs. The explanation of training the sequence engine 222 as explained with reference FIG. 4C is not repeated again as it is equivalent for generating the plurality of sequential MCC embeddings.

FIG. 6B represents a final embedding matrix 600B, in accordance with an example embodiment. More specifically, the final embedding matrix 600B includes the plurality of sequential MCC embeddings (i.e., 100 embeddings 615) generated for two thousand (2 k) MCCs 610 using a back propagation method to train the weights as explained above with reference to FIG. 4C. For the sake of simplicity, the MCCs such as MCC1 604*a*, MCC2 604*b*, MCC3 604*c*, MCC4 604*d*, MCC5 604*e* and MCC6 604*f* of FIG. 6A are shown for each of which corresponding 100 embeddings 615 are generated. A row 620 is shown to represent columns feature1, feature2 . . . feature100 for each MCC present in the corresponding rows.

In one embodiment, the processor 206 is configured to filter a sequential restricted MCC embedding from the plurality of sequential MCC embeddings. Further, a cosine similarity function is utilized by the similarity computation engine 228 of FIG. 2 to compute a similarity value i.e., a sequential MCC similarity value with respect to the sequential restricted MCC embedding.

Figure 7A:
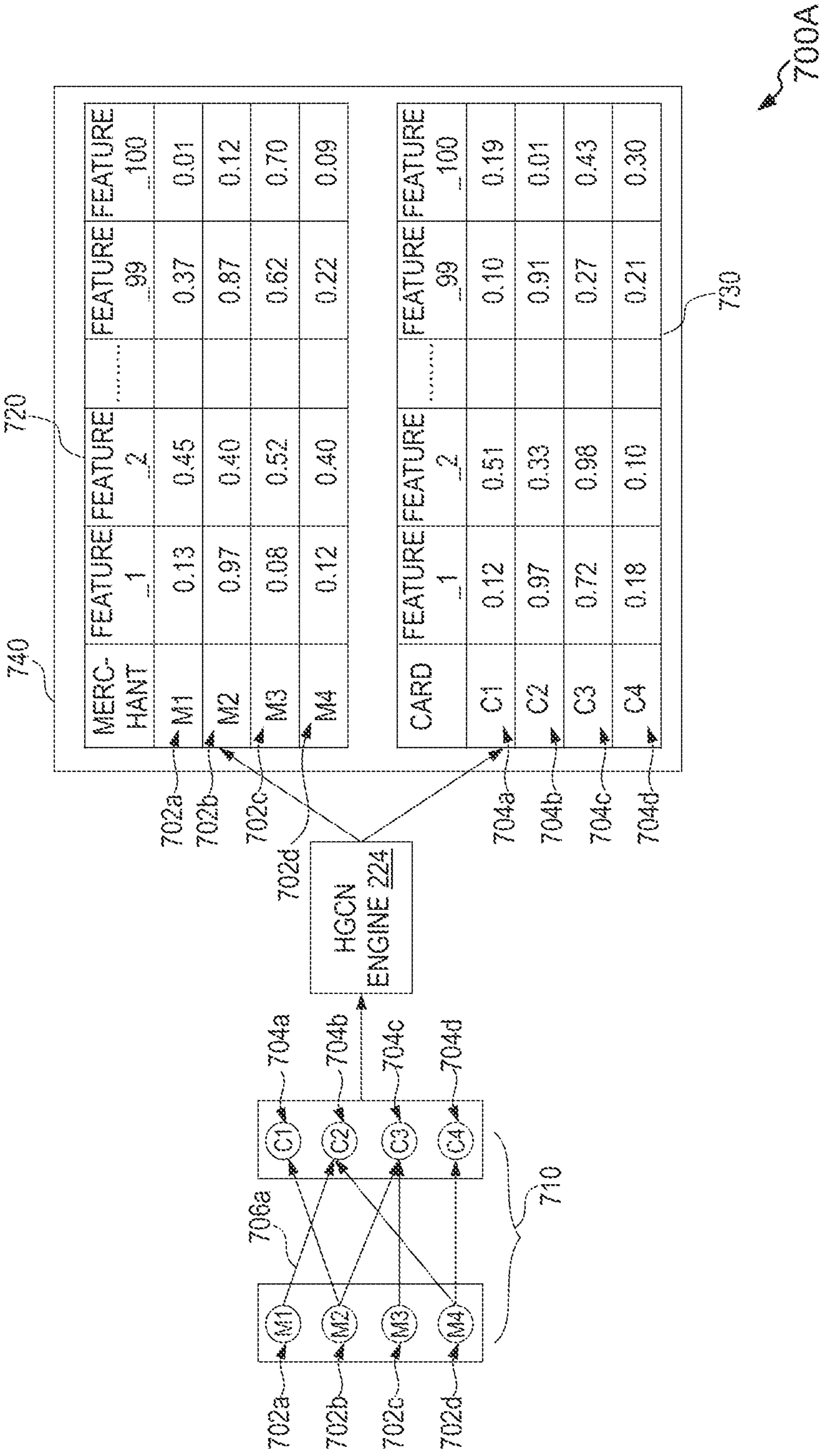
FIG. 7A shows a representation of a high-level architecture of a Heterogenous Graph Convolutional Network (HGCN) engine, in accordance with an embodiment of the present disclosure.

FIG. 7A shows a representation 700A of a high-level architecture of the HGCN engine 224, in accordance with an example embodiment. Graph based embeddings allow to exploit the interactions (implicit and explicit) along with node features in the same space in one go, as opposed to the sequence based embeddings. Observing the merchants and cards interacting with each other via transactions as a connected graph helps to understand the topological relation amongst them which is not captured in the sequential embeddings. Merchant embeddings are generated from merchant card graph to capture attribute based topological relation among merchants. Such embeddings help capture the attributes of gambling merchants (encoded 7995) in the re-routing merchants as they appear in close proximity in topological structure. The approach uses graph embeddings in heterogenous setting to develop expressive transactional features that enable to use deep anomaly detection of identifying re-routing merchants.

An input 710/a bipartite graph 710 is created using merchant nodes M1 702*a*, M2 702*b*, M3 702*c* and M4 702*d* connected to one or more card nodes C1 704*a*, C2 704*b*, C3 704*c*, and C4 704*d* via corresponding transaction links represented as edges connecting the merchant nodes and the card nodes. An exemplary edge 706*a* is shown to be connecting the merchant node M1 702*a* to the card node C2 704*b* representing a transaction taking place between both the nodes. A bipartite graph is a graph where there are two sets of nodes in heterogeneous manner and there is never a connection between same type of nodes. It means that a connection between a card and a card does not exist. From the bipartite graph 710, it is possible to capture the topological structure in the merchant space. For example, a transaction processed using the card C3 704*c* gets a decline under MCC 7995 of the merchant M2 702*b* and a transaction gets an approval on the neighbor node i.e., merchant M3 702*c* processed using the card C3 704*c*. As can be seen from the bipartite graph, M2 702*b* and M3 702*c* are in close proximity in terms of topological structure. It may be inferred that the transaction coming from M3 702*c* for the card C3 704*c* is a re-routed transaction corresponding to the declined transaction under MCC 7995 of the merchant M2 702*b* for the card C3 704*c*.

In one embodiment, heterogeneous transformations, i.e. first aggregating the nearby nodes' feature vectors depending on the type or feature space without itself are generated, and then the nodes' own features are aligned through an output model. This helps to learn a representation which incorporates both the nodes' features and the neighbor node features and network structure information.

In order to generate the graph based embeddings, information about the nodes (merchants and cards) and edges (transaction) is passed to the HGCN engine 224. Some non-exhaustive examples of merchant node features (e.g., 'p' features) include MCC, merchant country, industry, percentage share of ecommerce, percentage share of recurring, percentage cardholder present, average spend per customer, number of customers, overall approval rates and the like. Some non-exhaustive examples of card node features (e.g., 'q' features) include type of a card, issuer country, average spend of the card, percentage spend across different MCCs and the like. Edge information (i.e., features between a pair of merchant node and a card node) include a total transaction count.

For a number of merchant nodes denoted as 'm', each having 'p' features, a merchant feature matrix of [m×p] is generated and denoted as $X_{merchants}$. For a number of card nodes denoted as 'c', each having 'q' features, a card feature matrix of [c×q] is generated and denoted as $X_{cards}$. An adjacency matrix denoted as 'A' of node connections representing graph topology [m×c] is also generated. All these (forming the bipartite graph 710) are fed to the HGCN engine 224.

As shown, the HGCN engine 224 is trained to generate an output dataset 740 including graph based merchant embeddings 720 and graph based card embeddings 730 respectively, for the merchants M1 702*a*, M2 702*b*, M3 702*c* and M4 702*d* and the card C1 704*a*, C2 704*b*, C3 704*c*, and C4 704*d*. The number of embeddings is exemplarily depicted as 100, there may be 'n' number of embeddings/features generated for the merchants and the cards.

Figure 7B:
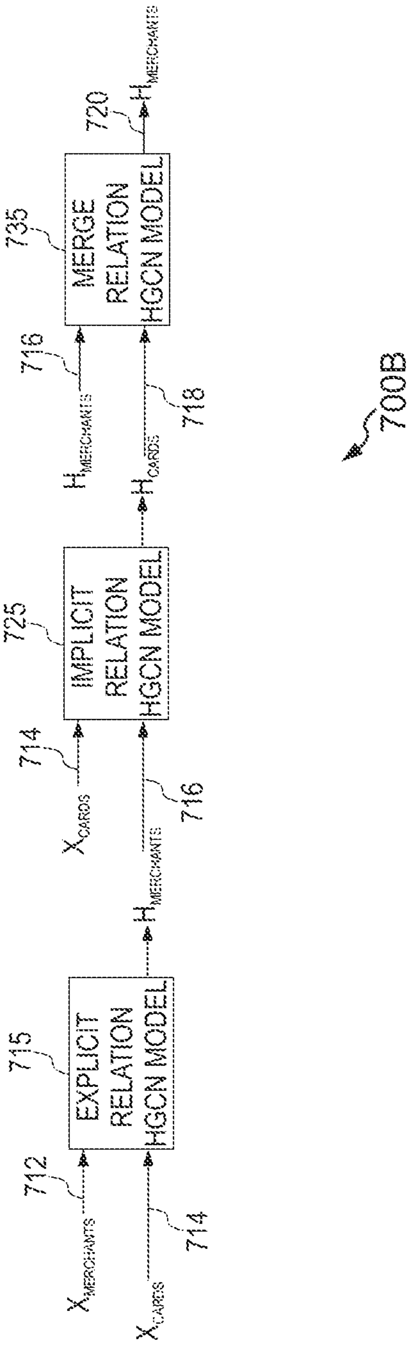
FIG. 7B shows a representation of a 3-step HGCN layer integrated into the HGCN engine, in accordance with one embodiment of the present disclosure.

FIG. 7B shows a representation 700B of a 3-step HGCN layer integrated into the HGCN engine 224 for generating the plurality of graph based merchant embeddings 720, in accordance with an example embodiment. The HGCN engine 224 is a multi-layered structure. Each layer includes three components, namely, an explicit relation HGCN model, an implicit relation HGCN model and a merge relation HGCN model. One such 3-step HGCN layer is shown in the representation 700B. An explicit relation HGCN model 715 is configured to capture information of the neighbouring nodes and not the node itself. i.e., the explicit relation between the nodes of different types. An implicit relation HGCN model 725 is configured to capture the indirect connection information between the nodes of the same type. A merge relation HGCN model 735 is configured to merge the representations from previous step to get a representation containing both implicit and explicit relations. Thus, embeddings are generated using explicit (based on direct connection) and implicit (based on indirect connection) relations in the bipartite graph which helps capture not only merchant-merchant or card-card relation but also merchant-card relation.

As shown, the first of 3-steps HGCN layer is an explicit learning step. The explicit relation HGCN model 715 is fed the merchant feature matrix $X_{merchants}$ 712 and the card feature matrix $X_{cards}$ 714. The purpose is to learn node representation for the merchants so that it includes the feature information of the merchants and also includes the cards neighbour features and network topology information. The output of the explicit relation HGCN model 715 is hidden representation $H_{merchants}$ 716. $H_{merchants}$ 716 does not contain an indirect network topology relationship.

The second step of 3-step HGCN layer is an implicit learning step. It takes $H_{merchants}$ 716 and $X_{cards}$ 714 as input to the implicit relation HGCN model 725. The output representation $H_{cards}$ 718 contains feature information of cards and also includes its merchant neighbour features and network topology information.

The third step of 3-step HGCN layer is a merge learning step. It takes explicit representation $H_{merchants}$ 716 and the implicit representation $H_{cards}$ 718 as input to the merge relation HGCN model 735. The output representation $H_{merchants'}$ 720 includes both implicit and explicit representation and network information. $H_{merchants'}$ 720 is the merchant feature matrix including the merchant embeddings 720 for the merchants M1 702*a*, M2 702*b*, M3 702*c* and M4 702*d* of FIG. 7A. Similarly, a card feature matrix $H_{cards'}$ (not shown in FIG. 7B) may be generated using one or more 3-step HGCN layers that would include the card embeddings 730 for the cards C1 704*a*, C2 704*b*, C3 704*c*, and C4 704*d* of FIG. 7A.

In one embodiment, the HGCN engine 224 is regarded as an encoder-decoder model, where the encoder encodes both the graph topology and the feature information from the disjointed set and the decoder maps the hidden representation with nodes' own features since one node's connection is highly related to its own features. Since information from different types of nodes is aggregated, it is desirable that the nodes (merchant/cards) retain their property by optimizing the embeddings in a manner that is capable of capturing the original (merchant/card) features ($X_{merchants}$ 712/$X_{cards}$ 714). A decoder branch (not shown) is used to reconstruct the features from the learnt embeddings and use the loss between original and constructed features to optimize the entire network. To align the similarity with the node features i.e., $X_{merchants}$ 712 and the hidden representation $H_{merchants}$ 716, the HGCN with a decoder model may be designed.

In one embodiment, the processor 206 is configured to filter a plurality of graph based restricted MCC merchant embeddings from the plurality of graph based merchant embeddings. Thereafter, a graph based restricted MCC merchant embedding is computed by calculating a weighted average of the plurality of graph based restricted MCC merchant embeddings. The weighted average is based on the number of transactions for each merchant. Further, a cosine similarity function is utilized by the similarity computation engine 228 of FIG. 2 to compute a similarity value i.e., a graph based merchant similarity value with respect to the graph based restricted MCC merchant embedding.

In one embodiment, the processor 206 is configured to identify a plurality of risky cards having performed a higher number of gambling transactions or any restricted MCC transactions compared to a predefined gambling/restricted MCC threshold value. The processor 206 is further configured to filter a plurality of graph based risky card embeddings associated with the plurality of risky cards from the plurality of graph based card embeddings. Thereafter, a graph based risky card embedding is computed by calculating an average of the plurality of graph based risky card embeddings. Further, a cosine similarity function is utilized by the similarity computation engine 228 of FIG. 2 to compute a similarity value i.e., a graph based card similarity value with respect to the graph based risky card embedding.

The embeddings generated using the graph network and the sequential model, the similarity values computed with respect to the restricted embeddings etc. are included in the plurality of features that is generated for each transaction of each transaction window of a plurality of transaction windows to capture an anomalous transaction. In an example embodiment, the following features are generated for each transaction as exemplarily represented in Table-1.

TABLE 1

| Feature | Feature Type | Dimension |
|---|---|---|
| Merchant embedding reduced by PCA (sequential) | Merchant | 5 |
| Merchant embedding reduced by PCA (graph based) | Merchant | 5 |
| Merchant similarity with respect to MCC 7995 merchant embedding (sequential) | Merchant | 1 |
| Merchant similarity with respect to MCC 7995 merchant embedding (graph based) | Merchant | 1 |
| Merchant MCC embedding similarity with MCC 7995 embedding (sequential) | Merchant | 1 |
| Card embedding reduced by PCA (sequential) | Card | 5 |
| Card embedding reduced by PCA (graph based) | Card | 5 |
| Card similarity with respect to risky card embedding (sequential) | Card | 1 |
| Card similarity with respect to risky card embedding (graph based) | Card | 1 |
| Number (#) of MCC 7995 transactions | Card | 1 |
| Number (#) of non MCC 7995 transactions | Card | 1 |
| Approval rate of MCC 7995 transactions | Card | 1 |
| Approval rate of non MCC 7995 transactions | Card | 1 |
| Average ticket size of MCC 7995 approval | Card | 1 |
| Average ticket size of MCC 7995 decline | Card | 1 |
| Transaction Amount | Transactional | 1 |
| Transaction Time | Transactional | 1 |
| Approved/Declined (Transaction Status) | Transactional | 1 |
| Gambling MCC or not (Whether MCC of the transaction is MCC 7995) | Transactional | 1 |

As shown, a card feature such as an average ticket size of MCC 7995 approval represents total approval amount on MCC 7995 merchants by card/total approval count on MCC 7995 merchants by card. Similarly, an average ticket size of MCC 7995 decline represents total declined amount on MCC 7995 merchants by card/total declined count on MCC 7995 merchants by the card. The plurality of features is stored in the transaction database 155.

Figure 8:
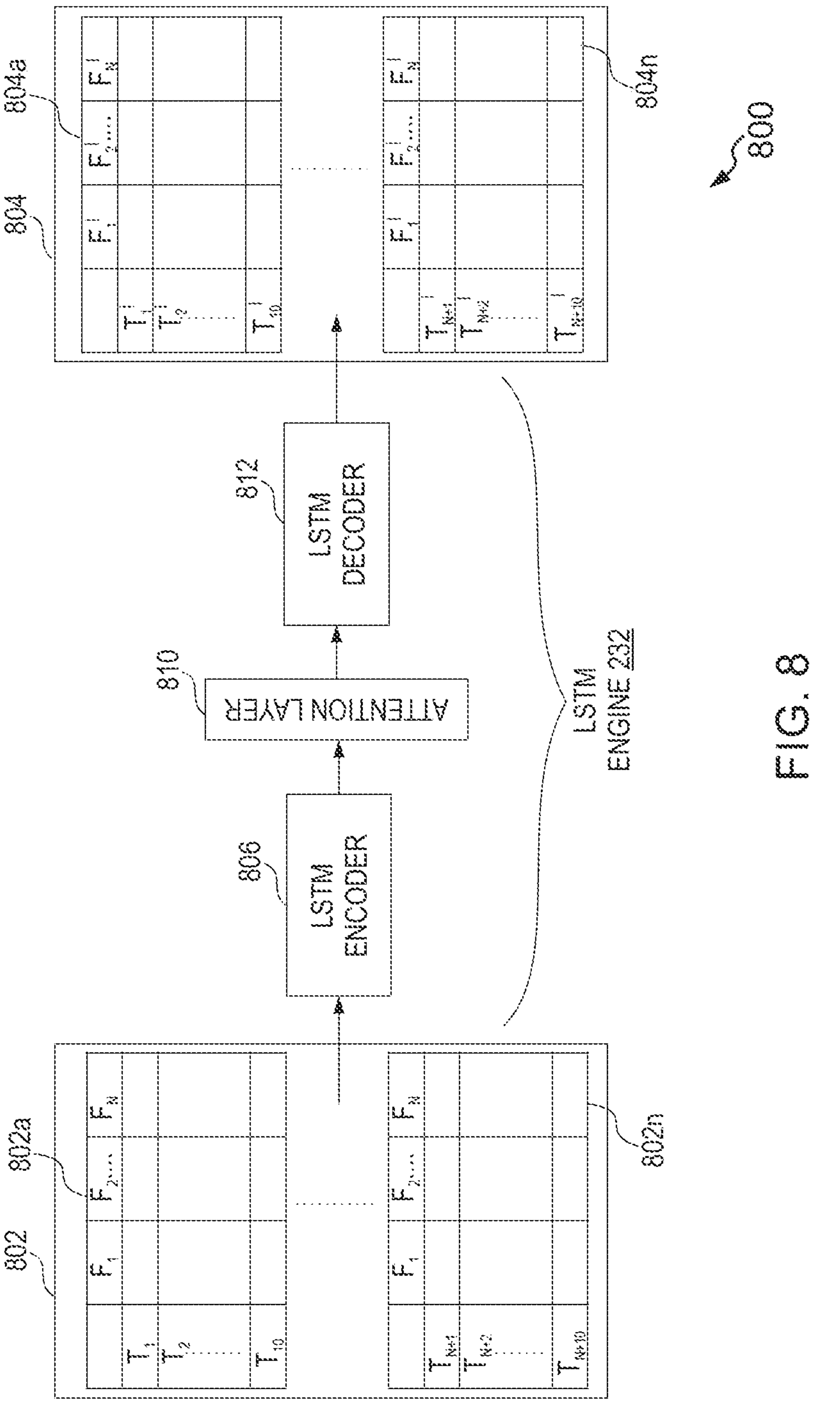
FIG. 8 shows a representation of training a neural network engine, in accordance with one embodiment of the present disclosure.

FIG. 8 shows a representation 800 of training the neural network engine 232, in accordance with an example embodiment. In at least one embodiment, a Long-Short Term Memory (LSTM) autoencoder with attention layer is trained to detect re-routed transactions. The neural network engine 232 is hereinafter alternatively referred as the LSTM model/engine 232. An LSTM model is known to learn well from sequence data and helps capture patterns in a sequence based data.

Next step is to prepare the data that can be consumed by the LSTM model 232. Each input data point in an LSTM model is a 2-d matrix of time step x features. In one embodiment, a transaction window (time step x features) is created by appending a plurality of features (as represented in Table-1) associated with each transaction for each transaction of a set of transactions (e.g., 10 transactions) within a specific time period (i.e., time step) (e.g., within a day). Further, each transaction window is associated with a payment instrument such as a payment card. In another embodiment, a transaction window including a set of transactions is retrieved from the transaction database 155 and thereafter, the associated plurality of features of each transaction of the set of transactions is appended. Accordingly, a training dataset 802 is generated by appending the plurality of features to each associated transaction for each transaction of each transaction window of the plurality of transaction windows retrieved from the transaction database 155 for training the neural network engine 232. The plurality of features associated with each transaction of a transaction window is accessed from the transaction database 155.

The plurality of transaction windows is depicted as 802*a* . . . to 802*n*. In one embodiment, the transaction windows are created using a rolling window concept. The transaction window 802*a* is shown to include 10 transactions depicted as $T_1$, $T_2$, . . . $T_{10}$. The transactions $T_1$, $T_2$ . . . $T_{10}$ refer to corresponding transaction IDs of each transaction. The plurality of features associated with each transaction is depicted as $F_1$, $F_2$, . . . $F_n$. Some non-exhaustive examples of the plurality of features associated with each transaction as shown in Table-1 include merchant embedding (sequential) (e.g., $F_1$), merchant embedding (graph based) (e.g., $F_2$), . . . gambling MCC or not (e.g., $F_n$). Similarly, each transaction window of the training dataset 802 includes the features $F_1$ to $F_n$ appended to each 10 transactions. If total number of transactions for a card is less than 10 for a day, the transaction window is padded with 0. Further, each transaction window of the plurality of transaction windows is generated without including a re-routed transaction (pre-labeled) and a corresponding MCC 7995 declined transaction.

The LSTM Autoencoder is an implementation of an autoencoder for sequential data using an Encoder-Decoder LSTM architecture. The LSTM engine 232 includes an LSTM encoder 806, an attention layer 810 and an LSTM decoder 812. Although only one unrolled the LSTM encoder 806 and one unrolled LSTM decoder 812 are shown, it will be appreciated that any number of LSTM blocks may be used. An autoencoder is a type of artificial neural network that learns efficient data encodings in an unsupervised manner. The goal of an autoencoder is to learn a latent representation for a set of data using encoding and decoding. By doing that, the neural network learns the most important features in the data. An output dataset 804 that includes a plurality of reconstructed transaction windows such as 804*a* . . . to 804*n* is shown. The transaction window 804*a* is shown to include 10 reconstructed transactions depicted as $T_1'$, $T_2'$, . . . $T_{10}'$. The plurality of reconstructed features associated with each transaction is depicted as $F_1'$, $F_2'$ . . . $F_n'$. After the decoding, the training dataset 802 is compared to the output dataset 804 to examine the difference.

If there is a big difference (i.e., the reconstruction loss is high), then it means that the LSTM model 232 struggled in reconstructing the data, thus, this data point is suspected as an anomaly. Back propagation method is used for reducing the reconstructed loss in the training phase. The weights of the LSTM model 232 are changed based on the error calculated using the back propagation formula. Alternatively, various optimization techniques such as stochastic gradient descent and the like may be employed to adjust weights. The training dataset 802 is repeatedly fed to the LSTM engine 232 to minimize the reconstruction loss for training the model optimally. When a desired reconstruction loss is achieved, the LSTM engine 232 is considered as trained to detect anomalous transaction.

Figure 9:
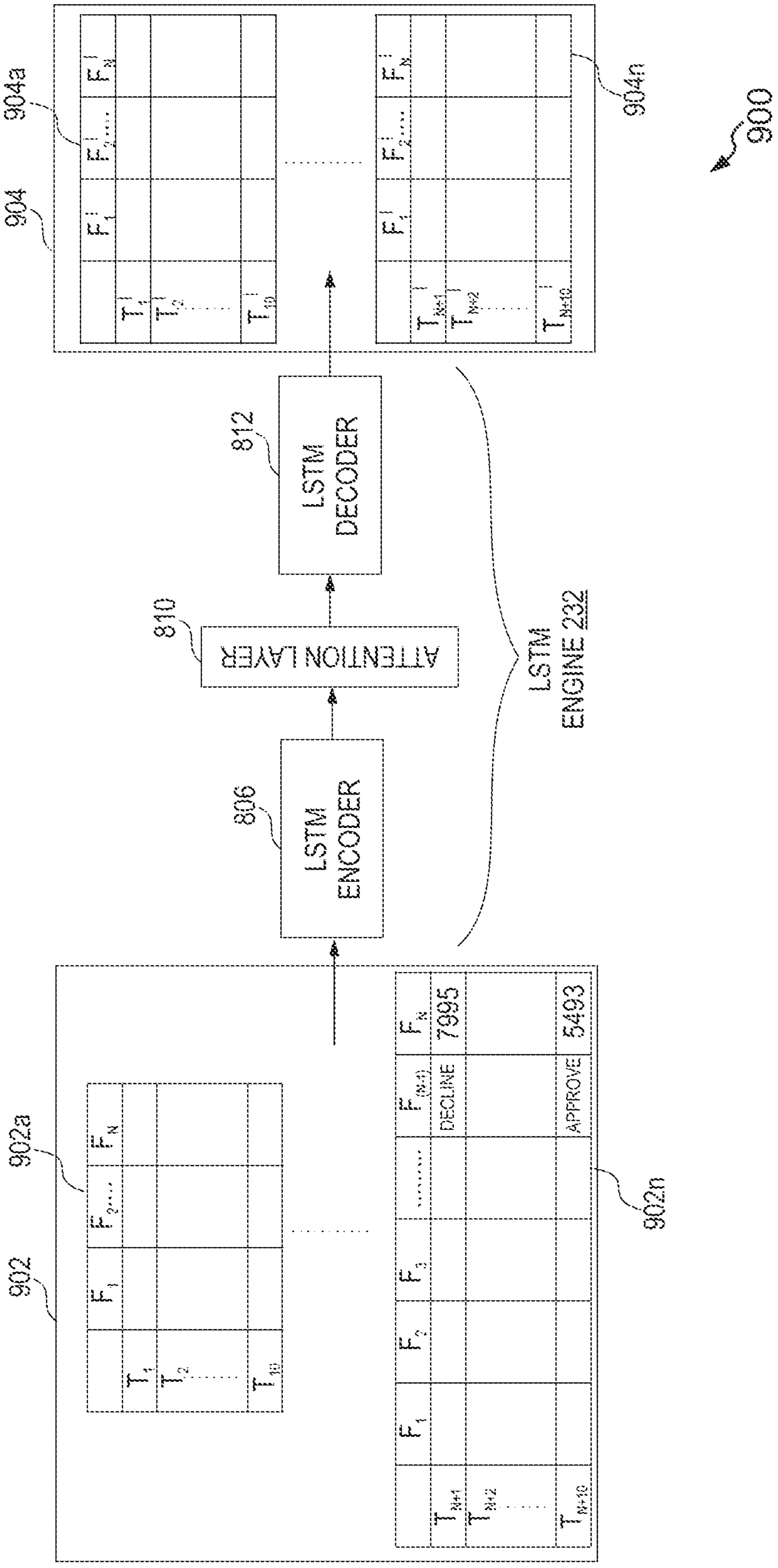
FIG. 9 shows a representation of a validation phase of the trained neural network engine, in accordance with one embodiment of the present disclosure.

FIG. 9 shows a representation 900 of a validation phase of the trained neural network engine 232, in accordance with an example embodiment. A validation dataset 902 is created using a plurality of transaction windows such as a transaction window 902*a* . . . a transaction window 902*n*. The transaction window 902*a* is shown to include 10 transactions depicted as $T_1$, $T_2$, . . . $T_{10}$. The plurality of features associated with each transaction (as shown in Table-1) is depicted as $F_1$, $F_2$ . . . $F_n$. As shown, the validation dataset 902 includes at least one re-routing transaction window 902*n*. The re-routing transaction window 902*n* further includes at least one declined transaction under restricted MCC and a corresponding re-routed transaction. The associated features of a transaction $T_{n+1}$ shows that the transaction $T_{n+1}$ is an MCC 7995 declined transaction (i.e., $F_{n-1}$ and $F_n$) and the associated features of a transaction $T_{n+10}$ show that the transaction $T_{n+10}$ is an approved transaction under MCC 5493 (an example of a pre-labeled re-routed transaction). An output dataset 904 that includes a plurality of reconstructed transaction windows such as 904*a* . . . to 904*n* are shown. The transaction window 904*a* is shown to include 10 reconstructed transactions depicted as $T_1'$, $T_2'$, . . . $T_{10}'$. The plurality of reconstructed features associated with each transaction is depicted as $F_1'$, $F_2'$ . . . $F_n'$. After the decoding, the validation dataset 902 is compared to the output dataset 904 to examine the difference.

As the LSTM engine 232 is not trained to reconstruct an MCC declined transaction and a re-routed transaction, the reconstruction loss for those transactions compared to other normal transaction is very high. It is noted that the reconstruction loss is computed for each transaction of each transaction window. The plurality of reconstruction loss values computed during the validation phase is hereinafter alternatively referred to as plurality of validation phase reconstruction loss values. As explained with reference to FIG. 2, the reconstruction loss computation engine 230 is configured to compute each validation phase reconstruction loss value.

Figure 10:
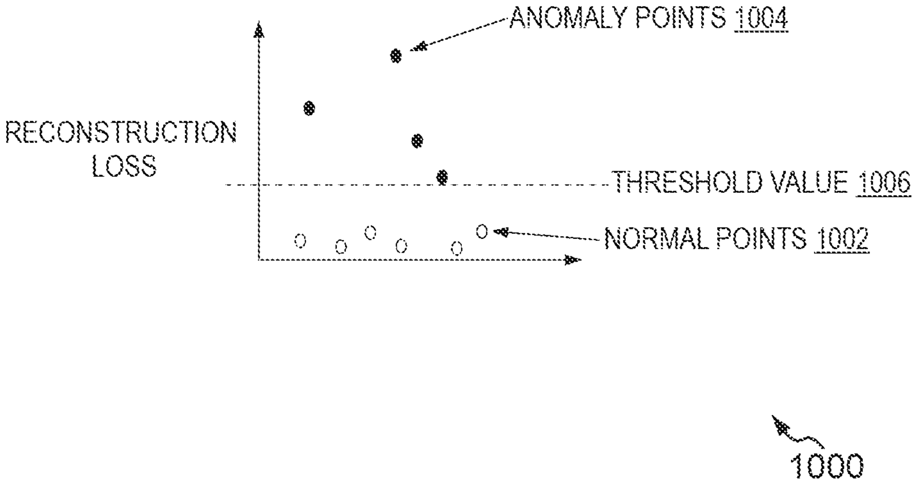
FIG. 10 shows representation of a graph for determining a threshold value, in accordance with one embodiment of the present disclosure.

FIG. 10 is an example representation of a graph 1000 for determining a threshold value, in accordance with an example representation. The threshold value is determined during the validation phase of the LSTM engine 232. As the validation dataset 902 includes at least one re-routing transaction window 902*n*, and the LSTM engine 232 is trained without including a re-routing transaction window, it becomes difficult for the LSTM engine 232 to reconstruct the re-routing transaction window 902*n* with a minimal loss. Therefore, the corresponding reconstruction loss value for the reconstructed re-routing transaction window 904*n* comes very high compared to the reconstruction loss values for the other normal transactions. As shown, normal points 1002 refer to minimal reconstruction loss for normal transactions i.e., the transactions which are not declined under a restricted MCC and the transactions which are not re-routed transactions corresponding to the declined transactions under the restricted MCC. Anomaly points 1004 refer to the transactions which are declined under a restricted MCC and the transactions which are re-routed transactions corresponding to the declined transactions under the restricted MCC. Based on these points, a threshold value 1006 is determined as shown by a dotted line to show that a reconstruction loss for a reconstructed transaction that is higher than the threshold value 1006 is considered as an anomalous transaction. In an example embodiment, the threshold value 1006 is dependent on the business understanding and the technical aspects. In one embodiment, the LSTM engine 232 may be tested on a test data after the validation phase.

Figure 11:
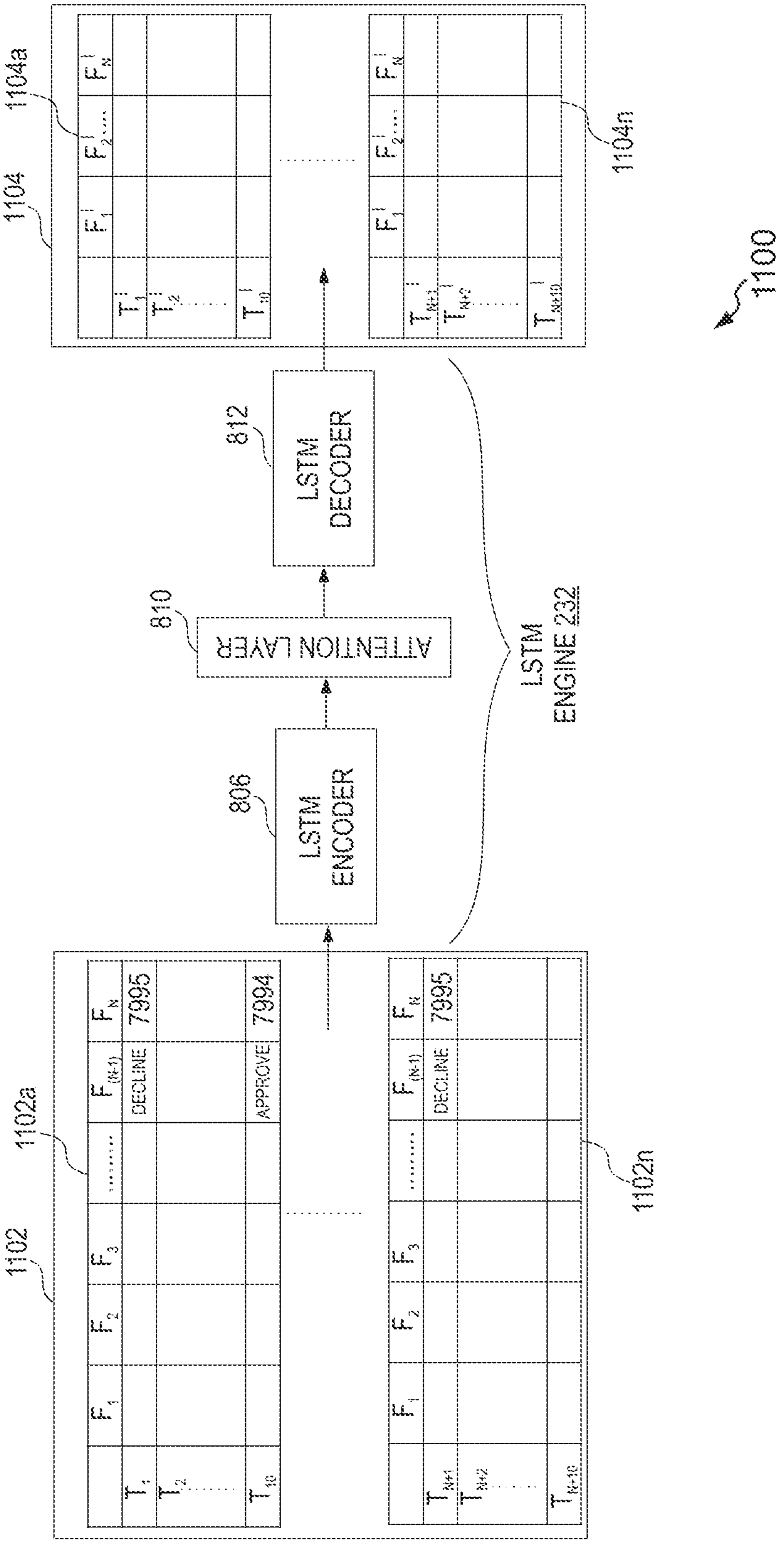
FIG. 11 shows a representation of an evaluation phase of the trained neural network engine, in accordance with one embodiment of the present disclosure.

FIG. 11 shows a representation 1100 of an evaluation phase of the trained neural network engine 232, in accordance with an example embodiment. An evaluation dataset 1102/an input dataset 1102 is created using a plurality of transaction windows such as a transaction window 1102*a* . . . a transaction window 1102*n*. The transaction window 1102*a* is shown to include 10 transactions depicted as $T_1$, $T_2$, . . . $T_{10}$. The plurality of features associated with each transaction (as shown in Table-1) is depicted as merchant embedding (sequential) being ($F_1$), merchant embedding (graph based) being ($F_2$), . . . gambling MCC or not being ($F_n$). Further, first transaction of each transaction window is kept as a transaction declined under a restricted MCC for which a corresponding re-routed transaction is to be identified. As shown, the transaction window 1102*a* includes a transaction $T_1$ as a declined transaction under MCC 7995 (i.e., $F_{n-1}$ and $F_n$) and an approved transaction $T_{10}$ as a corresponding re-routed transaction having MCC 7994 (i.e., corresponding $F_{n-1}$ and $F_n$). Also, the transaction window 1102*n* further includes a transaction $T_{n+1}$ as a declined transaction under MCC 7995. The task of the LSTM engine 232 is to identify the transaction $T_{10}$ as the re-routing transaction.

The trained LSTM engine 232 predicts an output dataset 1104 that includes a plurality of reconstructed transaction windows such as 1104*a* . . . to 1104*n* as shown. The transaction window 1104*a* is shown to include 10 reconstructed transactions depicted as $T_1'$, $T_2'$, . . . $T_{10}'$. The plurality of reconstructed features associated with each transaction is depicted as merchant embedding (sequential) being ($F_1'$), merchant embedding (graph based) being ($F_2'$), gambling MCC or not being ($F_n'$).

A corresponding reconstruction loss value for each transaction of each transaction windows (i.e., 1102*a* . . . to 1102*n*) is computed by comparing each transaction of the input dataset 1102 with each corresponding reconstructed transaction of each reconstructed transaction windows (i.e., 1104*a* . . . 1104*n*) of the output dataset 1104. A mean squared error between a plurality of features of a transaction and a plurality of reconstructed features of a reconstructed transaction is calculated to compute the corresponding reconstructed loss value for the transaction. The process is followed for each transaction of all the transaction windows 1102*a* . . . to 1102*n*. As explained with reference to FIG. 10, if a reconstruction loss value computed for the transaction $T_{10}$ of the transaction window 1102*a* is higher than the threshold value 1006, then the processor 206 is configured to mark/identify the transaction $T_{10}$ as the re-routing transaction corresponding to the transaction $T_1$ declined under MCC 7994.

The kind of features that are generated previously (as represented with reference to Table-1), makes it difficult for the LSTM model 232 to re-construct the re-routing transactions, hence the re-construction loss value for such transaction is high. Once the re-routed transactions are identified, the corresponding merchant involved in re-routing is identified using the 'cleansed merchant name' in the transaction details. These miscoded merchants are then fined for their fraudulent activity. One of the objectives of the invention is to catch the merchant who is helping a merchant encoded under a restricted MCC for which the payment network 145 or the issuer server 135 is declining a transaction. To go that merchant, various embodiments, help in generation of the proofs via a pair of transactions, one being declined under a restricted MCC and second being the corresponding re-routed transaction in one-on-one manner so the associated merchants can be targeted for initiating a compliance or legal action.

Further, various embodiments also help determining other re-routing patterns. For example, a transaction) of a merchant m1 having 'x' amount is declined. It is possible to identify an approved re-routing transaction in the vicinity of 'x' amount and plus or minus 10% of the 'x' amount and a certain time period. However, a transaction2 of a merchant m2 having '1.5×' amount is approved. The semantic relation developed between the merchants m1 and m2 using the sequence engine 222 is highly correlated. At an overall aggregate level, m2 is showing a lot of MCC 7995 behavior, despite having transaction amount being 1.5 times (i.e., 1.5×). Therefore, even if the amount is beyond a particular range, it is possible to identify that transaction2 is a re-routed transaction corresponding to transaction1.

FIGS. 12A and 12B collectively represent a flow diagram of a computer-implemented method 1200 for identifying a re-routed transaction, in accordance with an example embodiment. The method 1200 depicted in the flow diagram may be executed by the system 120 or the system 200. Operations of the method 1200, and combinations of operation in the method 1200, may be implemented by, for example, hardware, firmware, a processor, circuitry and/or a different device associated with the execution of software that includes one or more computer program instructions. The method 1200 starts at operation 1202.

At operation 1202, the method 1200 includes retrieving, by a processor 206, a plurality of transaction windows from a transaction database. Each transaction window of the plurality of transaction windows includes a transaction declined under a restricted MCC and each transaction window is associated with a respective payment instrument.

At operation 1204, the method 1200 includes accessing, by the processor 206, a plurality of features associated with each transaction of each transaction window from the transaction database. The plurality of features includes a sequential merchant similarity value with respect to a previously generated sequential restricted MCC merchant embedding, a graph based merchant similarity value with respect to a previously generated graph based restricted MCC merchant embedding, a sequential card similarity value with respect to a previously generated sequential risky card embedding, a graph based card similarity value with respect to a previously generated graph based risky card embedding, and a sequential merchant MCC similarity value with respect to a previously generated sequential restricted MCC embedding.

At operation 1206, the method 1200 includes generating, by the processor 206, an input dataset by appending the plurality of features to each associated transaction for each transaction of each transaction window of the plurality of transaction windows.

At operation 1208, the method 1200 includes predicting, by the processor 206, an output dataset including a plurality of reconstructed transaction windows based on feeding the input dataset to a trained neural network model.

At operation 1210, the method 1200 includes computing, by the processor 206, a corresponding reconstruction loss value for each transaction of each transaction window. A reconstruction loss value for an individual transaction is computed by comparing the individual transaction with a corresponding reconstructed transaction.

At operation 1212, the method 1200 includes comparing, by the processor 206, the corresponding reconstruction loss value for each transaction of each transaction window with a pre-determined threshold value.

If a corresponding reconstruction loss value for a transaction of a transaction window is higher than the pre-determined threshold value, then at operation 1214, the method 1200 includes identifying, by the processor 206, the transaction as a re-routed transaction corresponding to the transaction declined under the restricted MCC of the transaction window.

FIGS. 13A and 13B collectively represent a flow diagram of another computer-implemented method 1300 for identifying a re-routed transaction, in accordance with an example embodiment. The method 1300 depicted in the flow diagram may be executed by the system 120 or the system 200. Operations of the method 1300, and combinations of operation in the method 1300, may be implemented by, for example, hardware, firmware, a processor, circuitry and/or a different device associated with the execution of software that includes one or more computer program instructions. The method 1300 starts at operation 1302.

At operation 1302, the method 1300 includes retrieving, by a processor 206, a transaction window associated with a payment card from a transaction database. First transaction of the transaction window is a transaction declined under a restricted MCC.

At operation 1304, the method 1300 includes accessing, by the processor 206, a plurality of transactional features, a plurality of card features, and a plurality of merchant features associated with each transaction of the transaction window from the transaction database. The plurality of merchant features includes a sequential merchant similarity value with respect to a previously generated sequential restricted MCC merchant embedding, a graph based merchant similarity value with respect to a previously generated graph based restricted MCC merchant embedding, and a sequential merchant MCC similarity value with respect to a previously generated sequential restricted MCC embedding and the plurality of card features includes a sequential card similarity value with respect to a previously generated sequential risky card embedding, a graph based card similarity value with respect to a previously generated graph based risky card embedding.

At operation 1306, the method 1300 includes generating, by the processor 206, an input dataset by appending the plurality of transactional features, the plurality of card features, and the plurality of merchant features to each associated transaction for each transaction of the transaction window.

At operation 1308, the method 1300 includes predicting, by the processor 206, an output dataset including a reconstructed transaction window based on feeding the input dataset to a previously trained Long Short-Term Memory (LSTM) Autoencoder with an attention layer model.

At operation 1310, the method 1300 includes computing, by the processor 206, a corresponding reconstruction loss value for each transaction of the transaction window by comparing each transaction of the input dataset with each corresponding reconstructed transaction of the reconstructed transaction window of the output dataset.

At operation 1312, the method 1300 includes comparing, by the processor, the corresponding reconstruction loss value for each transaction of the transaction window with a pre-determined threshold value. The threshold value is previously determined based on a plurality of validation phase reconstruction loss values computed after training of the LSTM autoencoder with attention layer model during a validation phase. A validation dataset utilized for computing plurality of validation phase reconstruction loss values includes a plurality of transaction windows including at least one re-routing transaction window. The at least one re-routing transaction window further includes at least one declined transaction under restricted MCC and a corresponding re-routed transaction.

At operation 1314, the method 1300 includes if a corresponding reconstruction loss value for a transaction is higher than the pre-determined threshold value, identifying, by the processor, the transaction as a re-routed transaction corresponding to the transaction declined under the restricted MCC.

Figure 14:
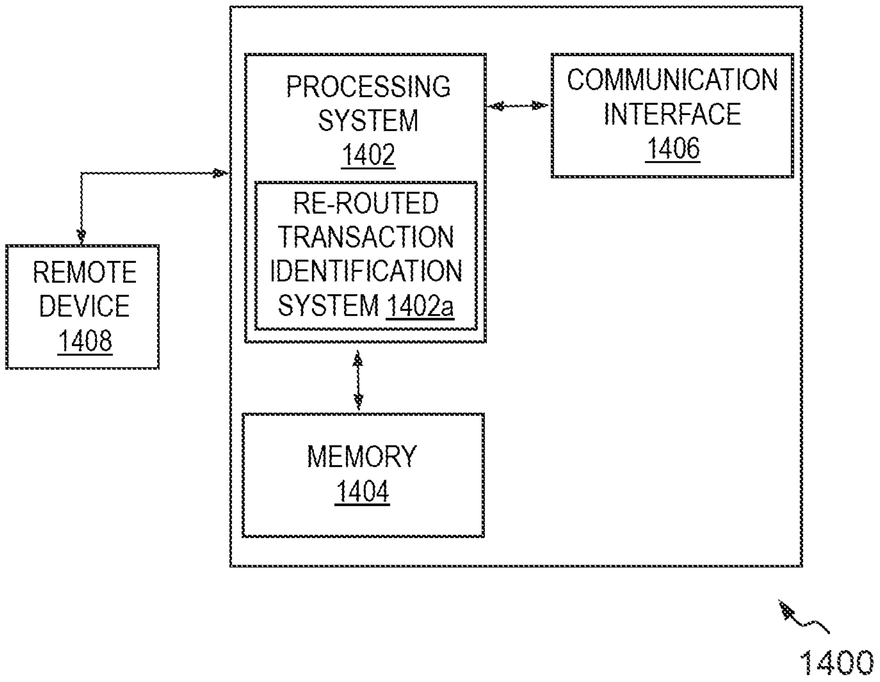
FIG. 14 is a simplified block diagram of a server system, in accordance with an example embodiment of the present disclosure.

FIG. 14 is a simplified block diagram of a server system 1400, in accordance with one embodiment of the present disclosure. In one embodiment, the server system 1400 is an example of a server system that includes a re-routed transaction identification system 1402*a*. The re-routed transaction identification system 1402*a* is same as the system 120 shown and explained with reference to FIG. 1. In one embodiment, the server system 1400 is the payment server 140 of FIG. 1. The server system 1400 includes a processing system 1402 configured to extract programming instructions from a memory 1404 to provide various features of the present disclosure. Further, two or more components may be embodied in one single component, and/or one component may be configured using multiple sub-components to achieve the desired functionalities. Some components of the server system 1400 may be configured using hardware elements, software elements, firmware elements and/or a combination thereof. In one embodiment, the server system 1400 is configured to identify a re-routed transaction corresponding to a transaction declined under a restricted MCC using deep learning techniques.

Via a communication interface 1406, the processing system 1402 receives information from a remote device 1408 such as the issuer server 135, the acquirer server 130, the merchant server 125, the transaction database 155, the payment server 140 and the like. The processing system 1402 also includes re-routed transaction identification system 1402*a*. The server system 1400 may perform similar operations as performed by the system 200 for identifying re-routed transactions, declined transactions under restricted MCCs, miscoded merchants, fraudulent merchants associated with restricted MCCs and the like using one or more deep learning models. For the sake of brevity, the detailed explanation of the server system 1400 is omitted herein with reference to the FIG. 2.

The components of the server system 1400 provided herein may not be exhaustive, and the server system 1400 may include more or fewer components than those depicted in FIG. 14. Further, two or more components may be embodied in one single component, and/or one component may be configured using multiple sub-components to achieve the desired functionalities. Some components of the server system 1400 may be configured using hardware elements, software elements, firmware elements and/or a combination thereof.

The disclosed methods with reference to FIGS. 12A-12B and FIGS. 13A-13B, or one or more operations of the system 200 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method executed by a server in a payment network, the method comprising:

training, by a processor of the server, a sequence model to generate a plurality of sequential merchant embeddings for merchants retrieved from a transaction database, wherein training the sequence model comprises generating positive merchant pairs and negative merchant pairs from transaction history sequences and using back propagation to train weights of an embedding matrix to maximize distance between merchants of negative merchant pairs and minimize distance between merchants of positive merchant pairs;

training, by the processor, a Heterogeneous Graph Convolutional Network (HGCN) model to generate a plurality of graph based merchant embeddings and a plurality of graph based card embeddings from a bipartite graph comprising merchant nodes and card nodes connected by transaction edges, wherein the HGCN model comprises an explicit relation HGCN model configured to capture information of neighboring nodes of different types, an implicit relation HGCN model configured to capture indirect connection information between nodes of a same type, and a merge relation HGCN model configured to merge representations from the explicit relation HGCN model and the implicit relation HGCN model;

generating a plurality of features of a transaction from the plurality of sequential merchant embeddings, the plurality of graph based merchant embeddings, and the plurality of graph based card embeddings;

storing the plurality of features of the transaction in a transaction database;

retrieving, by a processor of the server, a plurality of transaction windows from the transaction database, each transaction window of the plurality of transaction windows comprising a transaction declined under a restricted Merchant Category Code (MCC) and each transaction window associated with a respective payment instrument;

accessing, by the processor, the plurality of features associated with each transaction of each transaction window from the transaction database, the plurality of features comprising a sequential merchant similarity value with respect to a previously generated sequential restricted MCC merchant embedding, a graph based merchant similarity value with respect to a previously generated graph based restricted MCC merchant embedding, a sequential card similarity value with respect to a previously generated sequential risky card embedding, a graph based card similarity value with respect to a previously generated graph based risky card embedding, a sequential merchant MCC similarity value with respect to a previously generated sequential restricted MCC merchant embedding, and the plurality of sequential merchant embeddings and the plurality of graph based merchant embeddings generated by the trained sequence model and the trained HGCN model, respectively, wherein the sequential merchant embeddings and the graph based merchant embeddings are reduced in dimensionality using Principal Component Analysis (PCA) prior to computing similarity values, each of the plurality of features associated with a plurality of merchants being weighted in the transaction database, with weights being trained using back propagation;

generating, by the processor, an input dataset by appending the plurality of features to each associated transaction for each transaction of each transaction window of the plurality of transaction windows, wherein each of the plurality of features forms an original feature vector for a respective transaction prior to reconstruction;

reconstructing, by the processor executing a trained Long Short-Term Memory (LSTM) autoencoder with an attention layer, the input dataset to predict an output dataset comprising a plurality of reconstructed transaction windows, wherein the LSTM autoencoder comprises an LSTM encoder, the attention layer, and an LSTM decoder;

computing, by the processor, a reconstruction loss value for each transaction of each transaction window by calculating a mean squared error between features of each transaction in the input dataset and reconstructed features of each corresponding reconstructed transaction in the output dataset;

comparing, by the processor, the reconstruction loss value for each transaction of each transaction window with a threshold value, wherein the threshold value is determined based on reconstruction loss values computed during a validation phase that includes at least one re-routing transaction window; and based on a reconstruction loss value for a transaction of a transaction window being higher than the threshold value, identifying, by the processor, the transaction as a re-routed transaction corresponding to the transaction declined under the restricted MCC of the transaction window and storing an indication of the identified transaction as the re-routed transaction in the transaction database.

2. The method as claimed in claim 1, wherein the MCC is MCC 7995.

3. The method as claimed in claim 1, wherein the sequential restricted MCC merchant embedding is previously generated for training the LSTM autoencoder by computing a weighted average of a plurality of sequential restricted MCC merchant embeddings generated using the sequence model, and wherein the sequence model is trained to generate corresponding sequential merchant embeddings for the plurality of merchants retrieved from the transaction database.

4. The method as claimed in claim 3, further comprising:

generating corresponding sequential card embeddings for all cards retrieved from the transaction database using a weighted average of the sequential merchant embeddings;

identifying a plurality of risky cards having performed a higher number of restricted MCC transactions compared to a predefined restricted MCC threshold value; and generating a sequential risky card embedding for training the LSTM autoencoder by computing an average of a plurality of sequential risky card embeddings associated with the plurality of risky cards.

5. The method as claimed in claim 1, wherein the sequential restricted MCC merchant embedding is previously generated for training the LSTM autoencoder using the sequence model, and wherein the sequence model is trained to generate corresponding sequential MCC embeddings for all MCCs retrieved from the transaction database.

6. The method as claimed in claim 1, wherein the graph based restricted MCC merchant embedding is previously generated for training the LSTM autoencoder by computing a weighted average of a plurality of graph based restricted MCC merchant embeddings generated using the HGCN model, and wherein the HGCN model is trained to generate corresponding graph based merchant embeddings for the plurality of merchants retrieved from the transaction database and wherein the HGCN model is trained to simultaneously generate corresponding graph based card embeddings for all cards retrieved from the transaction database.

7. The method as claimed in claim 6, further comprising:

identifying a plurality of risky cards having performed a higher number of restricted MCC transactions compared to a predefined restricted MCC threshold value; and generating a graph based risky card embedding for training the LSTM autoencoder by computing an average of a plurality of graph based risky card embeddings generated using the HGCN model, the plurality of graph based risky card embeddings associated with the plurality of risky cards.

8. The method as claimed in claim 1, wherein a respective cosine similarity function is used for computing the sequential merchant similarity value, the graph based merchant similarity value, the graph based card similarity value, the sequential card similarity value and the sequential merchant MCC similarity value.

9. The method as claimed in claim 1, wherein the plurality of features further comprises a transaction amount, a transaction status, a transaction time, a transaction type, a number of restricted MCC transactions processed using the respective payment instrument, and an approval rate for the number of restricted MCC transactions processed using the respective payment instrument.

10. The method as claimed in claim 1, wherein a mean squared error between a plurality of features of a transaction and a plurality of reconstructed features of a reconstructed transaction is calculated to compute a corresponding reconstructed loss value for the transaction.

11. The method as claimed in claim 1, wherein the threshold value is previously determined based on a plurality of validation phase reconstruction loss values computed after training of the LSTM autoencoder during the validation phase, wherein the at least one re-routing transaction window further comprises at least one declined transaction under restricted MCC and a corresponding re-routed transaction.

12. The method as claimed in claim 1, wherein each transaction window of the plurality of transaction windows comprises first transaction as the transaction declined under the restricted MCC.

13. A system comprising:

a memory comprising executable instructions; and a processor communicably coupled to a communication interface and configured to execute the instructions to cause the system to at least:

train a sequence model to generate a plurality of sequential merchant embeddings for merchants retrieved from a transaction database, wherein training the sequence model comprises generating positive merchant pairs and negative merchant pairs from transaction history sequences and using back propagation to train weights of an embedding matrix to maximize distance between merchants of negative merchant pairs and minimize distance between merchants of positive merchant pairs;

train a Heterogeneous Graph Convolutional Network (HGCN) model to generate a plurality of graph based merchant embeddings and a plurality of graph based card embeddings from a bipartite graph comprising merchant nodes and card nodes connected by transaction edges, wherein the HGCN model comprises an explicit relation HGCN model configured to capture information of neighboring nodes of different types, an implicit relation HGCN model configured to capture indirect connection information between nodes of a same type, and a merge relation HGCN model configured to merge representations from the explicit relation HGCN model and the implicit relation HGCN model;

generate a plurality of features of a transaction from the plurality of sequential merchant embeddings, the plurality of graph based merchant embeddings, and the plurality of graph based card embeddings;

store the plurality of features of the transaction in a transaction database;

retrieve a plurality of transaction windows from the transaction database, each transaction window of the plurality of transaction windows comprising a transaction declined under a restricted Merchant Category Code (MCC) and each transaction window associated with a respective payment instrument;

access the plurality of features associated with each transaction of each transaction window from the transaction database, the plurality of features comprising a sequential merchant similarity value with respect to a previously generated sequential restricted MCC merchant embedding, a graph based merchant similarity value with respect to a previously generated graph based restricted MCC merchant embedding, a sequential card similarity value with respect to a previously generated sequential risky card embedding, a graph based card similarity value with respect to a previously generated graph based risky card embedding, and a sequential merchant MCC similarity value with respect to a previously generated sequential restricted MCC merchant embedding, and the plurality of sequential merchant embeddings and the plurality of graph based merchant embeddings generated by the trained sequence model and the trained HGCN model, respectively, wherein the sequential merchant embeddings and the graph based merchant embeddings are reduced in dimensionality using Principal Component Analysis (PCA) prior to computing similarity values, each of the plurality of features associated with a plurality of merchants being weighted in the transaction database, with weights being trained using back propagation;

generate an input dataset by appending the plurality of features to each associated transaction for each transaction of each transaction window of the plurality of transaction windows, wherein each of the plurality of features forms an original feature vector for a respective transaction prior to reconstruction;

execute a trained Long Short-Term Memory (LSTM) autoencoder with an attention layer configured to process the input dataset to predict an output dataset comprising a plurality of reconstructed transaction windows, wherein the LSTM autoencoder comprises an LSTM encoder, the attention layer, and an LSTM decoder;

compute a reconstruction loss value for each transaction of each transaction window by calculating a mean squared error between features of each transaction in the input dataset and reconstructed features of each corresponding reconstructed transaction in the output dataset;

compare the reconstruction loss value for each transaction of each transaction window with a threshold value, wherein the threshold value is determined based on reconstruction loss values computed during a validation phase that includes at least one re-routing transaction window; and based on a reconstruction loss value for a transaction of a transaction window being higher than the threshold value, identify the transaction as a re-routed transaction corresponding to the transaction declined under the restricted MCC of the transaction window and store an indication of the identified transaction as the re-routed transaction in the transaction database.

14. The system as claimed in claim 13, wherein the MCC is MCC 7995.

15. The system as claimed in claim 13, wherein the plurality of features further comprises a transaction amount, a transaction status, a transaction time, a transaction type, a number of restricted MCC transactions processed using the respective payment instrument, and an approval rate for the number of restricted MCC transactions processed using the respective payment instrument.

16. The system as claimed in claim 13, wherein the threshold value is previously determined based on a plurality of validation phase reconstruction loss values computed after training of the LSTM autoencoder during the validation phase, wherein the at least one re-routing transaction window further comprises at least one declined transaction under restricted MCC and a corresponding re-routed transaction.

17. A computer-implemented method comprising:

training a sequence model to generate a plurality of sequential merchant embeddings for merchants retrieved from a transaction database, wherein training the sequence model comprises generating positive merchant pairs and negative merchant pairs from transaction history sequences and using back propagation to train weights of an embedding matrix to maximize distance between merchants of negative merchant pairs and minimize distance between merchants of positive merchant pairs;

training a Heterogeneous Graph Convolutional Network (HGCN) model to generate a plurality of graph based merchant embeddings and a plurality of graph based card embeddings from a bipartite graph comprising merchant nodes and card nodes connected by transaction edges, wherein the HGCN model comprises an explicit relation HGCN model configured to capture information of neighboring nodes of different types, an implicit relation HGCN model configured to capture indirect connection information between nodes of a same type, and a merge relation HGCN model configured to merge representations from the explicit relation HGCN model and the implicit relation HGCN model;

generating a plurality of transactional features of a transaction from the plurality of sequential merchant embeddings, the plurality of graph based merchant embeddings, and the plurality of graph based card embeddings;

storing the plurality of transactional features of the transaction in a transaction database;

retrieving, by a processor, a transaction window associated with a payment card from the transaction database, a first transaction of the transaction window being a transaction declined under a restricted Merchant Category Code (MCC);

accessing, by the processor, the plurality of transactional features, a plurality of card features, and a plurality of merchant features associated with each transaction of the transaction window from the transaction database, the plurality of merchant features comprising a sequential merchant similarity value with respect to a previously generated sequential restricted MCC merchant embedding, a graph based merchant similarity value with respect to a previously generated graph based restricted MCC merchant embedding, a sequential merchant MCC similarity value with respect to a previously generated sequential restricted MCC merchant embedding, and sequential merchant embeddings and graph based merchant embeddings generated by the trained sequence model and the trained HGCN model, respectively, wherein the sequential merchant embeddings and the graph based merchant embeddings are reduced in dimensionality using Principal Component Analysis (PCA) prior to computing similarity values, and the plurality of card features comprising a sequential card similarity value with respect to a previously generated sequential risky card embedding, and a graph based card similarity value with respect to a previously generated graph based risky card embedding;

generating, by the processor, an input dataset by appending the plurality of transactional features, the plurality of card features, and the plurality of merchant features to each associated transaction for each transaction of the transaction window, wherein each of the plurality of transactional features forms an original feature vector for a respective transaction prior to reconstruction;

reconstructing, by the processor executing a trained Long Short-Term Memory (LSTM) autoencoder with an attention layer, the input dataset to predict an output dataset comprising a plurality of reconstructed transaction windows, wherein the LSTM autoencoder comprises an LSTM encoder, the attention layer, and an LSTM decoder;

computing, by the processor, a corresponding reconstruction loss value for each transaction of the transaction window by calculating a mean squared error between features of each transaction in the input dataset and reconstructed features of each corresponding reconstructed transaction in the output dataset;

comparing, by the processor, the corresponding reconstruction loss value for each transaction of the transaction window with a pre-determined threshold value, wherein the pre-determined threshold value is determined based on a plurality of validation phase reconstruction loss values computed during a validation phase, a validation dataset utilized for computing the plurality of validation phase reconstruction loss values comprising a plurality of transaction windows comprising at least one re-routing transaction window, the at least one re-routing transaction window further comprising at least one declined transaction under the restricted MCC and a corresponding re-routed transaction; and based on a corresponding reconstruction loss value for a transaction being higher than the pre-determined threshold value, identifying, by the processor, the transaction as a re-routed transaction corresponding to the transaction declined under the restricted MCC and storing an indication of the identified transaction as the re-routed transaction in the transaction database.

18. The method as claimed in claim 17, wherein the plurality of transactional features further comprises a transaction amount, a transaction status, a transaction time, a transaction type, and wherein the plurality of card features comprises a number of restricted MCC transactions processed using the payment card, and an approval rate for the number of restricted MCC transactions processed using the payment card.

19. The method as claimed in claim 1, wherein the LSTM autoencoder is trained without including a re-routing transaction window.

20. The method as claimed in claim 1, wherein each transaction window of the plurality of transaction windows is generated without including the re-routed transaction and a corresponding MCC 7995 declined transaction.

* * * * *